(12) United States Patent
Huang et al.

(10) Patent No.: US 11,205,031 B2
(45) Date of Patent: Dec. 21, 2021

(54) SYSTEM AND METHOD FOR FACILITATING USE OF COMMERCIAL OFF-THE-SHELF (COTS) COMPONENTS IN RADIATION-TOLERANT ELECTRONIC SYSTEMS

(71) Applicants: Qiang Huang, Rochester Hills, MI (US); Jing Jiang, London (CA)

(72) Inventors: Qiang Huang, Rochester Hills, MI (US); Jing Jiang, London (CA)

( * ) Notice: Subject to any disclaimer, the term of this patent is extended or adjusted under 35 U.S.C. 154(b) by 184 days.

(21) Appl. No.: 16/389,589

(22) Filed: Apr. 19, 2019

(65) Prior Publication Data

US 2020/0311331 A1 Oct. 1, 2020

Related U.S. Application Data

(60) Provisional application No. 62/810,237, filed on Feb. 25, 2019.

(51) Int. Cl.
| | |
|---|---|
| *G06F 30/00* | (2020.01) |
| *G06F 30/367* | (2020.01) |
| *G01R 31/00* | (2006.01) |
| *H03K 19/01* | (2006.01) |
| *H03K 19/003* | (2006.01) |
| *G06F 117/02* | (2020.01) |

(52) U.S. Cl.
CPC ........ *G06F 30/367* (2020.01); *G01R 31/003* (2013.01); *H03K 19/01* (2013.01); *G06F 2117/02* (2020.01); *H03K 19/0033* (2013.01)

(58) Field of Classification Search
CPC .............. G01R 31/003; H03K 19/0033; G06F 30/367; G06F 2117/02
See application file for complete search history.

(56) References Cited

U.S. PATENT DOCUMENTS

| | | | | | |
|---|---|---|---|---|---|
| 3,652,877 | A | * | 3/1972 | Smith | .............. H03K 17/73 |
| | | | | | 307/117 |
| 4,413,327 | A | * | 11/1983 | Sabo | ...................... G11C 29/74 |
| | | | | | 711/162 |
| 4,804,515 | A | * | 2/1989 | Crew | ....................... G05B 9/03 |
| | | | | | 376/216 |

(Continued)

OTHER PUBLICATIONS

Maier; "Low power error correction architecture for space"; IEEE Transactions on Nuclear Science, vol. NS-30, No. 6, Dec. 1983; pp. 4333-4338.*

*Primary Examiner* — Naum Levin

(57) ABSTRACT

A method for selecting components in a radiation tolerant electronic system, comprising, determining ionizing radiation responses of COTS devices under various radiation conditions, selecting a subset of the COTS devices whose radiation responses satisfy threshold radiation levels, applying mathematical models of the COTS devices for post-irradiation conditions to determine radiation responses to ionizing radiation; implementing a radiation-tolerant architecture using COTS devices from the selected subset, the implemented circuit may be tested for robustness to ionizing radiation effects without repeated destructive tests of the hardware circuit by using the mathematical models for simulating response to the ionizing radiation, and implementing a multi-layer shielding to protect the implemented circuit under various radiation conditions.

12 Claims, 10 Drawing Sheets

(56) References Cited

U.S. PATENT DOCUMENTS

| | | | | |
|---|---|---|---|---|
| 4,931,990 A * | 6/1990 | Perkin | G11C 5/005 | 365/1 |
| 5,923,830 A * | 7/1999 | Fuchs | G06F 11/1641 | 714/11 |
| 6,127,864 A * | 10/2000 | Mavis | H03K 3/0375 | 327/144 |
| 6,504,411 B2 * | 1/2003 | Cartagena | H03K 3/0375 | 327/199 |
| 6,583,470 B1 * | 6/2003 | Maki | H01L 27/0921 | 257/349 |
| 6,838,899 B2 * | 1/2005 | Plants | G06F 11/1008 | 326/10 |
| 6,938,183 B2 * | 8/2005 | Bickel | G06F 11/1658 | 714/12 |
| 6,948,091 B2 * | 9/2005 | Bartels | H04L 1/22 | 714/11 |
| 7,115,812 B2 * | 10/2006 | Applebaum | H01L 23/047 | 174/350 |
| 7,191,516 B2 * | 3/2007 | Patterson | H01L 23/556 | 29/840 |
| 7,260,742 B2 * | 8/2007 | Czajkowski | G06F 11/1497 | 714/17 |
| 7,310,759 B1 * | 12/2007 | Carmichael | G06F 11/1004 | 714/725 |
| 7,320,064 B2 * | 1/2008 | Ramos | G06F 13/4217 | 712/15 |
| 7,389,460 B1 * | 6/2008 | Demara | G01R 31/318519 | 714/733 |
| 7,395,168 B2 * | 7/2008 | Ibe | G01R 31/31816 | 702/115 |
| 7,467,326 B2 * | 12/2008 | Hillman | G06F 11/1658 | 714/11 |
| 7,589,558 B1 * | 9/2009 | Tseng | G06F 30/34 | 326/41 |
| 7,859,292 B1 * | 12/2010 | Shuler, Jr. | H03K 19/0075 | 326/11 |
| 8,237,228 B2 * | 8/2012 | Or-Bach | H01L 27/105 | 257/369 |
| 8,296,120 B2 * | 10/2012 | Phillips | G06F 30/34 | 703/16 |
| 8,397,133 B2 * | 3/2013 | Clark | G06F 9/3867 | 714/766 |
| 8,972,819 B2 * | 3/2015 | Morris | G06F 11/1008 | 714/758 |
| 8,988,922 B1 * | 3/2015 | Sang | G11C 11/4125 | 365/72 |
| 9,165,917 B2 * | 10/2015 | Cannon | H01L 27/092 | |
| 9,191,009 B1 * | 11/2015 | Clark | H01L 23/50 | |
| 9,209,684 B2 * | 12/2015 | Allum | H02M 3/073 | |
| 9,268,637 B2 * | 2/2016 | Gifford | G06F 11/1076 | |
| 9,275,747 B2 * | 3/2016 | Baumann | G11C 16/22 | |
| 9,425,187 B1 * | 8/2016 | Titus | H01L 29/7816 | |
| 9,947,390 B2 * | 4/2018 | Pan | G11C 11/418 | |
| 10,242,151 B2 * | 3/2019 | Donnelly | G06F 30/367 | |
| 10,488,461 B2 * | 11/2019 | Oster | G06F 30/34 | |
| 10,594,385 B2 * | 3/2020 | Buehler | H04W 16/28 | |
| 10,649,949 B1 * | 5/2020 | Suarez | H03K 19/0033 | |
| 10,666,280 B2 * | 5/2020 | Lee | H03M 1/785 | |
| 10,917,163 B2 * | 2/2021 | Rutt | H04B 1/0042 | |
| 2003/0034541 A1 * | 2/2003 | Essick | H01L 27/0605 | 257/505 |
| 2014/0139283 A1 * | 5/2014 | Grimes | H03K 19/00369 | 327/513 |
| 2014/0157223 A1 * | 6/2014 | Lilja | G06F 30/392 | 716/138 |
| 2015/0048209 A1 * | 2/2015 | Hoyt | B64G 1/58 | 244/131 |
| 2018/0190395 A1 * | 7/2018 | Clarkson | G05B 9/03 | |
| 2020/0220613 A1 * | 7/2020 | Rutt | H04B 7/1851 | |

\* cited by examiner

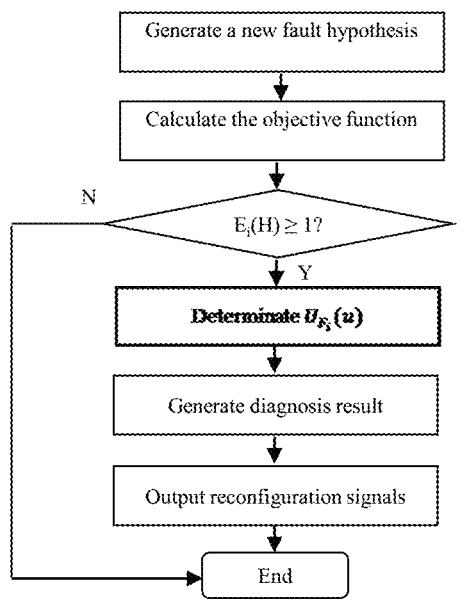
Fig. 11
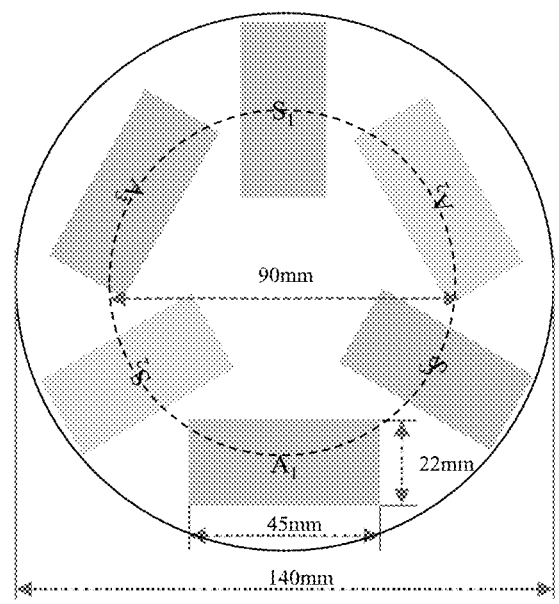
(a) Top view
Fig. 12a1

SYSTEM AND METHOD FOR FACILITATING USE OF COMMERCIAL OFF-THE-SHELF (COTS) COMPONENTS IN RADIATION-TOLERANT ELECTRONIC SYSTEMS

CROSS REFERENCE TO RELATED APPLICATIONS

This application claims the benefit of U.S. Patent Application No. 62/810,237 filed Feb. 25, 2019, the entirety of which is incorporated herein by reference.

FIELD

The present matter relates to the field of radiation tolerant electronic systems, and more particularly to methods and systems for a radiation tolerant architecture facilitating use of commercial off the shelf (COTS) components.

BACKGROUND

In high radiation environments, such as nuclear power plants, aeronautical systems, space systems, and military environments. electronic systems are usually designed with radiation hardened (rad-hardened) components to withstand ambient radiation levels. However, if massive increases in radiation occur over the ambient levels, as for example the release of radioactive substances in a nuclear power plant accident, it is important for the electronic systems to continue operating. Failure of monitoring instruments in these radiation environments may pose a challenge to monitoring important information in these environments. For example, in a nuclear plant disaster, such as the Fukushima Daiichi nuclear disaster, one of the biggest challenges after the accident for first responders was to obtain up-to-date status about the radiation sites and key safety related systems due to lack of operational monitoring instruments. Knowledge of important data indicative of conditions which may include amongst others radiation levels, water levels, humidity, gas levels, hydrogen concentrations, and temperatures.

An approach to monitoring, as for example in nuclear power plants (NPP), is to use separate wireless technologies, so termed, post-accident monitoring system (PAMS) to relay information about the environmental conditions, such as reactor integrity, and environment in the vicinity of the NPP as existing communication infrastructure may likely be damaged. However, even with this approach in the event of a severe nuclear accident, a significant amount of radiation may be released due to failure of protection layers, which may include alpha ($\alpha$), beta ($\beta$) particles, gamma ($\gamma$) rays, x-rays, and neutron particles. Consider the Fukushima accident as an example, in March 2012, the level of radiation particles was estimated to up to 73 Sv/h (Sievert/hour) inside the containment of No. 2 reactor, and in February 2017, this was up to 530 Sv/h. Studies have indicated that electronic components made of semiconductor materials may start to degrade when the ambient radiation level becomes higher than 10 Sv. These levels of radiation are high enough to cause severe functional damage to electronic components in the monitoring system if deployed at that site.

Another approach uses rad-hardened electronic components in such systems to increase radiation tolerance. A rad-hardened digital integrated circuit is a manufacturing level approach which consists in using particular process technologies (e.g. Silicon-on-Insulator) or/and circuit design patterns to improve the fault tolerance. This approach can be prohibitively expensive due to specialized semiconductor materials used in chip fabrication, complexity in manufacturing and packaging processes, and small market size to offset the investment in production. Furthermore, rad-hardened components are mostly based on proven often older technologies, and seldom match performance offered by newer components in terms of processing speed, memory size, and ultra-low power consumption expectations of modern monitoring systems. Furthermore, they are usually designed for a particular application not designed for scalability and therefore not reusable.

An approach to radiation tolerant architecture uses triple modular redundancy (TMR) to triplicate important circuits and subsystems, and then rely on a majority voting system or additional circuits to detect and correct radiation induced errors. However, added elements not only increase the overall system complexity, but some of them may not be redundant and are subject to faults common to all the duplicated circuits, termed common mode faults, being fed into the voter, possibly resulting in a faulty output and a potential system failure. Diverse TMR may be employed by designing functionally identical circuits each in a different domain to reduce the potential of common faults. However, these architectures may also not be entirely fault tolerant. For example, a fault tolerant platform developed for space applications adopts redundant architecture, but its inter-module communication and control buses are non-redundant. As such, the entire system could cease operation if a fault occurs in one module on the bus. In other examples, though multiple processing and memory units are used, the control logic unit has no redundancy, and it is also sensitive to radiation effects. These systems thus continue to have potential vulnerability to failure.

SUMMARY

In a general aspect the present matter provides an electronic system, for use in environments with high levels of radiation, wherein the system is configured to have a radiation tolerant architecture providing fault tolerant electronic circuits constructed, at least in part, with commercial off-the-shelf (COTS) components.

In one aspect of the present matter there is provided a method for a radiation tolerant electronic system, tolerant to cumulative and single event radiation effects, the method comprising: selecting a group of electronic components that continue to be operable below a designated cumulative radiation exposure threshold; and configuring a circuit architecture to employ said selected components, wherein said circuit architecture configuration is tolerant to said single event effects of radiation.

In a further aspect there is provided a radiation tolerant electronic system architecture comprising: a plurality of redundancy channels for executing a circuit function, and wherein each said channel duplicates the circuit function with distinct and different diversity of components from a group of electronic components selected based on one or more criteria related to radiation tolerance.

In a further aspect, of the architecture, the components are COTS components.

In a further aspect the architecture includes detecting and diagnosing mechanism configured in each of the plurality of channels wherein each channel is able to detect abnormal operation in one or more channels and provide reconfiguration information to activate or de-active channels.

In a still further aspect the channels are arranged to form a triple modular redundancy core of active and corresponding spare channels.

In a further aspect the architecture includes multilayer shielding each layer comprising different materials determined by the diversity of selected components.

In a still further aspect the architecture includes bus and power configurators for reconfiguring power and bus signals between channels in response to signals from the diagnosing and detecting mechanism.

In a still further aspect, the configurators are implemented with passive COTS components selected from one or more of resistors, capacitors and non-electronic relays.

In accordance the one aspect the present matter provides a method for selecting components in a radiation tolerant electronic system, comprising: determining ionizing radiation responses of COTS devices under various radiation conditions; selecting a subset of the COTS devices whose radiation responses satisfy threshold radiation levels; applying mathematical models of the COTS devices for post-irradiation conditions to determine radiation responses to ionizing radiation; and implementing a hardware circuit using COTS devices from the selected subset, the implemented circuit may be tested for robustness to ionizing radiation effects without repeated destructive tests of the hardware circuit by using the mathematical models for simulating response to the ionizing radiation.

In accordance with a further aspect of the present matter there is provided a radiation-tolerant design method for implement circuit functions using COTS components. In a further embodiment the present method may exclusively use COTS components. In an aspect the method includes one or more of: understanding vulnerabilities of various electronic components in ionizing radiation environments; developing a circuit architecture with a redundant channel configuration. This may include one or more of selecting diversified components with non-electronics-based switches for channel selection; adding on-line and in real-time fault-detection and prognostic schemes to switch among different channels, to maintain continued operation; and using diversified multi-layer shielding protections to reduce a total radiation level.

In an embodiment there is provided a radiation tolerant device comprising: three independent single-channel wireless devices, using diversified semiconductor components (such as bipolar, CMOS, and hybrid) in respective channels; and shielding protection having the single channel devices orientated within the shielding to minimize common mode faults.

In a further embodiment the present matter provides a method of operating a radiation tolerant system having redundant circuit channels, comprising: detecting failure in a channel by one or more of the failed channels diagnosis unit or from diagnosis units in channels external to the failed channel; and providing a reconfiguration signal from decision making units in non-failed channels, based on the detection by the diagnosis units, to remove power to the failed channel and to apply power to a spare channel.

BRIEF DESCRIPTION OF THE DRAWINGS

Embodiments of the present matter will now be described by way of example with reference to the accompanying drawings in which like references denote similar elements, and in which:

FIG. 11 shows a flowchart of fault diagnosis according to an embodiment of the present matter;

FIG. 12a1 shows a top view of a physical circuit board configuration according to an embodiment of the present matter;

FIGS. 12a2, 12b, 12c and 12d show respective layers of a multi-layer radiation shielding according to an embodiment off the present matter;

DETAILED DESCRIPTION

In accordance with a general embodiment of the present matter there is provided a radiation tolerant architecture to mitigate radiation damage to electronic circuits. The radiation effects may be grouped as cumulative effects and single-event-effects (SEEs). Cumulative effects due to total ionizing dose may be mitigated with, shielding protection, component selection, diversified hardware. SEE may be subdivided into nondestructive effects and destructive effects. Nondestructive effects may be mitigated with redundancy, system reset, and fault detection. Destructive effects may be mitigated with rapid power-off, redundancy, fault detection, prognostics or prediction of the component lifespan. Total ionizing dose (TID), which refers to the total amount of energy deposited by radiation particles passing through semiconductor materials. This is also a consideration when exposing electronic devices made from such materials in a strong radiation environment.

According to an embodiment of the present matter there is provided a method for investigation of radiation-tolerance of regular COTS components for suitability in a radiation tolerant electronic system. Most COTS-based semiconductor components may experience performance degradation and radiation damages when the total dose is greater than a threshold radiation value, typically 20 K Rad (Si). A principle of component selection is given to obtain the suitable components, as well as a method is proposed to assess the component reliability under radiation environments, which uses radiation degradation factors, instead of the usual failure rate data in the reliability model. Radiation degradation factor is as the input to describe the radiation response of a component under a total radiation dose. In addition, several typical semiconductor components are also selected as the candidate components for the application of wireless monitoring in nuclear power plants.

Figure 1:
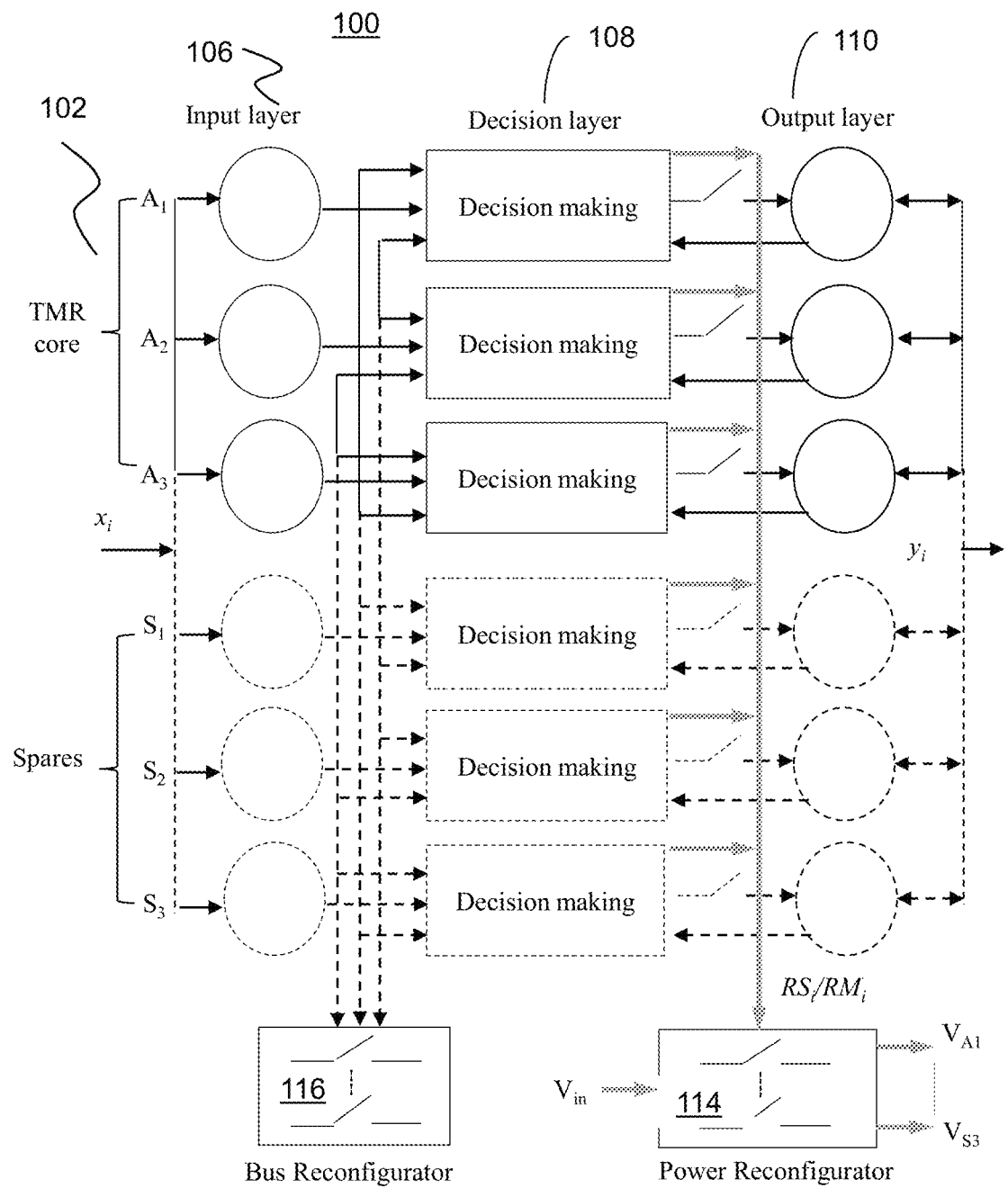
FIG. 1, shows a radiation-tolerant circuit architecture according to an embodiment of the present matter.

Referring to FIG. 1, there is shown a radiation-tolerant circuit architecture 100 for executing one or more selected functions in a high radiation environment according to an embodiment of the present matter. The architecture 100 includes a redundant core comprising a plurality of independent channels 102 each duplicating the selected function, the channels being divided into groups of active channels (Ai) and spare channels (Si), and configurator blocks 114, 116 for reconfiguring one or more of power supply lines and internal busses between channels 102 in an event of a fault or failure being detected in any one of the channels 102. Specifically, the configurator blocks are comprised of power configurator block 114 for reconfiguring power distribution to respective channels and a bus configurator block 116 to reconfigure the plurality of communication buses comprising independent and diversified buses for providing for intra-channel and extra-channel communication.

The channels 102 are notionally divided into an input layer 106, decision layer 108 and output layer 110 corresponding to respective functions performed in a channel. In one embodiment of the present matter each channel is implemented using COTS components. In a further embodiment of the present matter the respective active channels and their corresponding spare channels are implemented with diversified COTS component technologies.

In the illustrated embodiment the channels 102 are grouped to form triple modular redundancy (TMR) core of active channels ($A_1$, $A_2$, $A_3$), and a plurality of spare channels ($S_1$, $S_2$, $S_3$) each corresponding a respective active channel. In an event that an active channel has malfunctioned, its corresponding spare channel will be reconfigured to replace the failed channel or channels automatically as will be described herein. In other embodiments different numbers of channel groups, numbers of active channels and numbers of spare channels may be implemented.

The following definitions are used to describe various channel states for the instance of a single TMR core. Of course, more than one core may be used depending on the needs of a particular application:

Definition 1: the three active channels and three respective spares may be defined for one TMR core as follows. Note that in other embodiments there may be more than one TMR core.

$$A = \{A_1, A_2, A_3\} \ (1 \leq i \leq 3).$$

where $A_i$ represents the state of the $i_{th}$ channel with $A_i=1$ and 0, respectively, corresponding to its powered (active) state and non-power state (inactive).

$$S = \{S_1, S_2, S_3\} \ (1 \leq i \leq 3).$$

where $S_i$ represents the state of the $i_{th}$ spare channel with $S_i=1$ and 0, respectively, corresponding to its powered (active) state and non-power state (inactive).

Definition 2: for channel $A_i$ and $S_i$, their working conditions can be represented in the following sets:

$$F_{A_i} = \{F_{A_1}, F_{A_2}, F_{A_3}\}.$$

where $F_{A_i}$ describes the state of $A_i$ channel. If $A_i$ is completely broken, then $F_{A_i}=1$, otherwise $F_{A_i}=0$.

$$F_{S_i} = \{F_{S_1}, F_{S_2}, F_{S_3}\}.$$

where $F_{S_i}$ describes the state of $S_i$ channel. If $S_i$ is completely broken, then $F_{S_i}=1$, otherwise $F_{S_i}=0$.

While existing designs utilize three redundant duplicates for critical circuits and subsystems, they are usually followed by a majority voter to select the most desirable output or rely on extra added circuits to detect faults, a drawback is that these additional circuits themselves are also subject to the same radiation damage. Moreover, most of existing fault detection and diagnosis (FDD) methods for electronic systems mainly focus on common hardware or software faults in redundant systems, not on cross-board (cross channel) radiation damage. The present architecture 100 in contrast utilizes independent redundant channels without relying on additional detection units and/or hardware voters. The architecture 100 further provides for avoidance of common-mode damage between the redundant channels, and mechanisms for online fault detection, real time preventive remedial actions, and rapid power loss or removal. The radiation-tolerant architecture 100 also uses a decision-making unit to achieve a high level of radiation tolerance and to prolong the lifespan of COTS-based systems in radiation environments with a high level of radiation as will be described in more detail below As described above in one embodiment of the present matter the architecture 100 makes use non-rad-hardened commercial off-the-shelf (COTS) devices to implement circuit functions, so as to gain advantages offered by modern electronics. The COTS component implemented architecture is made more tolerant to radiation through (a) advanced circuit design through use of redundancies and fault-tolerant operating modes; and (b) properly designed radiation shielding using heavy materials against ionizing radiation. Hence, the designed system not only supports some of the advanced functionalities comparable to a state-of-the-art system ought to offer, but also sufficiently robust against high level radiation such systems may for example be deployed in a nuclear power plant so that after a severe accident to the system may continue to provide critical information for accident mitigation.

The diversified COTS component technologies in the redundant channels and their corresponding spare channels are implemented with diversity semiconductor technologies, e.g., one channel uses bipolar components, a second channel uses CMOS components, and a third channel uses hybrid components. Furthermore, the COTS semiconductor components are selected from those COTS components having higher radiation resistance than similar COTS components. This may be determined by calculation of their radiation degradation factor based on radiation test data, such that the selected component should work normally under the conditions of total dose specified. This is generally designated to be around 20 K Rad (Si) for some implementations, although other implementations may designate a different threshold value.

In embodiments, as described herein, the radiation-tolerant architecture 100 is configured to have independent and diversified redundancy, online fault-detection, real-time prognostic protection employing a prognostic algorithm to detect, identify, and prognosticate potential radiation-induced faults, rapid and proactive power off recovery, as well as radiation protection techniques and diversity against the common-mode failure and common-mode damage avoidance.

Furthermore, methods for improving the radiation resistance of each channel by assessing reliability under the given radiation conditions using modelling techniques according to further embodiments of the preset matter are described herein.

In selecting COTS components, photocurrent responses indicate that the photocurrents of the ideal p-n diode under different levels of ionizing radiations can be reduced dramatically if the bias voltage on the junction can be promptly reduced to zero. Hence, by removing power on the junction quickly in an event of radiation exposure, a semiconductor device may not be damaged permanently by the accumulated photocurrent. Thus, the radiation-tolerant architecture 100 includes rapid power off protection strategies.

To ensure continued operation of the system in the event of potential radiation damages, the present architecture 100 in one instance, makes use of redundancy to ensure that not all channels fail at the same time. Channels are configured to detect and to prognosticate faults and errors in a timely manner, and then locate faults and errors in order to generate a reconfiguration decision to deal with device power loss. Furthermore, in the redundant architecture, each redundant channel is completely independent and does not rely on inclusion of typical additional measurement/test units or hardware majority voters.

As an example of a typical application consider a sender in a modern digital remote communication/monitoring system that includes several subsystems such as input transducers, source encoders, channel encoders, modulators, and transmitters. In other words, the system may perform a selected function such as temperature monitoring. Self-diagnostic functions are integrated in the channel and therefore does not need any additional hardware. As mentioned above each redundant channel is notionally divided into three layers: the input layer, the decision layer, and the output layer. A task of the input layer is to provide an interface to receive information coming from inputs, such as, input sensors, source encoders, and channel encoders to name a few. Subsequently, fault detection, fault diagnosis, prognostic assessment, and reconfiguration suggestions, are accomplished in the decision layer. The output layer then transmits and/or receives data outside the environment in which the system is deployed. This is typically an over the air transmission and thus employs circuit components such as a digital modulator and transceiver. Functions of the parameter measurement and self-diagnosis are accomplished within each redundant channel, without additional measurement units to detect and diagnose faults.

One of the weaknesses in redundant systems is the vulnerability to common-mode failures. In accordance with an embodiment of the present architecture differences may be enforced for preventing common-mode failures in the present architecture. The following approaches are as follows:

Use diversified semiconductor technologies ($E_1$): Bipolar devices can withstand a higher total dose; but they are particularly sensitive to lower dose rates. On the other hand, MOS devices are sensitive to higher total doses and can also be robust to lower dose rates. Devices are chosen to complement these unique properties to cover perceivable conditions.

Rely on diversified, but functionally equivalent, components ($E_2$): Among different channels, devices (mainly CPUs) rely on different technologies to implement identical functions. In this case, a microcontroller, FPGA, and/or a microprocessor are used, as they offer different tolerance to radiation.

Select the same component, but from different manufacturers ($E_3$): Because different manufacturing processes, such as semiconductor materials, component size, etc., can realize the same functionalities for certain electronic components, but with different level of radiation tolerance, it is beneficial to select components of the same functionalities made by different manufacturers.

Use different tools for implementing different software and algorithms for the same functionalities ($E_4$): Due to memory utilization and storage locations, a same software module developed using different programming languages and environment may have different responses to radiation effects. In this case, different programming environments have been used to develop modules for different channels.

In summary, channels $A_i$ and $A_j$ (i=1, 2, 3; j=1, 2, 3; and i≠j) are built with diversified hardware, diversified software, as well as different shielding protection(described later). However, channels, $A_i$ and $S_i$ (i=1, 2, 3) are built with the same hardware, but different software logic to achieve the same functionalities. Thus, the protection measures used in different channels can be summarized as follows:

$$\begin{cases} A_i \ \& \ A_j (i \neq j): & E_1, E_2, E_3, E_4 \\ A_i \ \& \ S_j (i \neq j): & E_1, E_2, E_3, E_4 \\ A_i \ \& \ S_i: & E_4 \end{cases}$$

Fault Detection and Diagnosis

Even though measures have been taken, as described herein, at the system design and component selection processes, there is still a possibility that the system will not function trouble-free. To further improve the reliability of the system, real-time fault detection and diagnosis schemes are described herein according to embodiments of the present matter, so that remedial actions may be taken during operation to restore system performance, for example by a rapid power reset.

Figure 2:
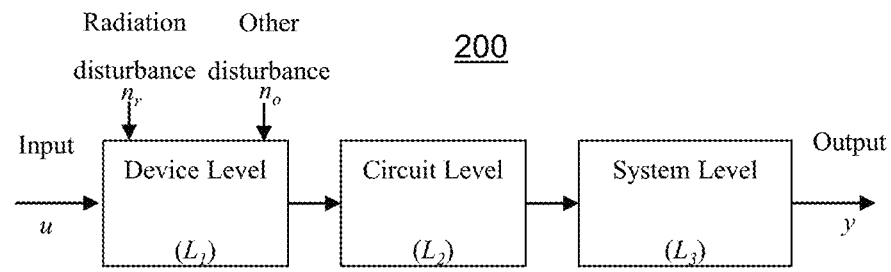
FIG. 2 shows an abstraction of a hierarchical fault model according to an embodiment of the present matter.

Referring to FIG. 2 there is shown an abstraction of a hierarchical fault model 200, according to an embodiment of the present matter. Radiation induced disturbances and/or other disturbances will directly affect the system at the device level, after which the disturbances will be transmitted to the circuit level and system level (subsystem). Faults at the device level (L1) correspond to sensors and semiconductor components; faults at the circuit level (L2) correspond to analog circuits, digital circuits, and mix circuits; and faults at the system level (L3) correspond to subsystems or functional modules.

As previously discussed, the system may be further configured to detect and prognosticate faults and errors in a timely manner, and then locate faults and errors in order to make a reconfiguration decision to deal with device power loss. The fault detection unit detects abnormal operating conditions of various levels under radioactive environments, and to estimate the nature and extent of the damages. Three definitions are given below to describe various states at device, circuit and subsystem levels:

Definition 3 (Device): An electronic system consists of a number ($n_d$) of components.

$$D = \{d_1, \ldots, d_{n_c}, \ldots, d_i\} \forall \, d_{c_i} (1 \le i \le n_d).$$

where $d_i$ represents the state of the $i_{th}$ component with $d_i=0$ being operational and 1 being fault states, respectively.

Definition 4 (Circuit): An electronic system consists of a number ($n_c$) of circuit modules. Each module consists of a number of components.

$$C = \{c_1, \ldots, c_{n_c}, \ldots, c_j\} \forall c_{c_j} (1 \leq j \leq n_c).$$

where $c_j$ represents the $j_{th}$ circuit modules in the electronic system. Similar representations are used to represent the operational and fault modes as in Definition 5 in all subsequent definitions.

Definition 5 (Subsystem): An electronic system can be decomposed into a number ($n_s$) of subsystems. Each subsystem consists of several circuit modules.

$$S = \{s_1, \ldots, s_{n_s}\} \forall s_k (1 \leq k \leq n_s).$$

where $s_k$ represents the $k_{th}$ subsystem.

Definition 6 (Functional State): For each circuit module and subsystem, two states can be defined:

$X_C$, $X_S$ represent the state that temporary fault or recovered failure in the circuit blocks and subsystems, with x=0 for operational and 1 for temporary fault or recovered failure, respectively.

$Y_C$, $Y_S$ represent the state that permanently fails in the circuit modules and subsystems, with y=0 for no failure and 1 for permanent failure, respectively.

For each circuit module, the following conditions can be defined for the operational state:

$$X_c = \{x_{c_1}, \ldots, x_{c_{n_c}}\} \forall x_{c_j}(1 \leq j \leq n_c).$$

If component $c_j$ operates incorrectly, $x_{c_j}=1$, otherwise $x_{c_j}=0$.

$$Y_c = \{y_{c_1}, \ldots, y_{c_{n_c}}\} \forall y_{c_j}(1 \leq j \leq n_c).$$

If $c_j$ has completely failed, $y_{c_j}=1$, otherwise $y_{c_j}=0$.

For each subsystem, the following state can be defined:

$$X_s = \{x_{s_1}, \ldots, x_{s_{n_s}}\} \forall x_{s_k}(1 \leq k \leq n_s).$$

If $s_k$ operates incorrectly, $x_{s_k}=1$, otherwise $x_{s_k}=0$.

$$Y_s = \{y_{s_1}, \ldots, y_{s_{n_s}}\} \forall y_{s_k}(1 \leq k \leq n_s).$$

If $s_k$ is completely failed, $y_{s_k}=1$, otherwise $y_{s_k}=0$.

Based on the above definitions, a fault hypothesis for malfunctions of circuit modules and subsystems can be formed in Eq. (1), where the goal is to integrate states of circuit modules and sub systems.

$$H=[X,Y] \quad (1)$$

where X is the summary of $X_C$ and $X_S$, as well as Y is the summary of $Y_C$ and $Y_S$.

A detection function E(H) reflects the credibility of H as defined in Eq. (2). A smaller E(H) suggests a higher credibility of H. If the detection function is equal or greater than unity, a reconfigure command should be issued.

$$E(H) = \sum_j^{n_c} (W_{xc_j} x_{c_j} + W_{yc_j} y_{c_j}) + \sum_k^{n_s} (W_{xs_k} x_{s_k} + W_{ys_k} y_{s_k}). \quad (2)$$

where $w_{xc_j}$, $w_{yc_j}$, $w_{xs_k}$, and $w_{ys_k}$ are the weights of the discrepancy index. The range of the weights is from 0.1 to 1. If $w_1 \gg w_2$, its means that the discrepancy index $w_1$ is much more important than $w_2$. The values of these weights are determined according to the significance of circuit modules and subsystems in electronic systems.

Prognostic for Lifespan of Components

Prognosis protection provides functions: (1) to predict the behavior of a circuit based on the present measurements, and hence to estimate whether a module or a subsystem can remain functional before complete failure occurs; and (2) to select the most appropriate channels for the radiation environment and corresponding characteristics of the diversified hardware. A hypothesis to predict malfunction of a device and a circuit block can be defined as follows:

$$P=[p_d, p_c]. \quad (3)$$

where $$p_d = \{p_{d_1}, \ldots, p_{d_{n_d}}\}$$

represents the state of the $i_{th}$ device with $p_{d_i}=0$ and 1, respectively, based on the prediction of its operational and fault states, and $$p_c = \{p_{c_1}, \ldots, p_{c_{n_c}}\}$$

represents the prediction of incorrect circuit operation. If $c_j$ is predicted to operate incorrectly, then $p_{c_j}=1$, otherwise $p_{c_j}=0$.

A prognostic function $E_n(P)$ can be formed to reflect the prediction state of the credibility of P, which can be defined in Eq. (4). A smaller $E_n(P)$ suggests a higher credibility of P.

$$E_n(P) = \sum_j^{n_d} W_{d_i} p_{d_i} + \sum_j^{n_c} W_{c_j} p_{c_j} (n=1,2,3). \quad (4)$$

where $w_{d_i}$ and $w_{c_j}$ are the weights of the discrepancy index of devices and circuit blocks.

A function can also be used to reflect whether a given specific semiconductor technology for a specific channel can work correctly in a given radiation environment.

$$R_n = f(s,d) (n=1,2,3). \quad (5)$$

where s is the information about the radiation environment; d is the information on the semiconductor technologies; and $R_n$ is the predicted channel selection. If channel n is estimated to have no capacity to operate in the given environment for a specific semiconductor technology, $R_n=1$, otherwise $R_n=0$.

Using the fault prognostic function, if $E_n(P)$ is equal or greater than 1 or $R_n=1$, the reconfiguration command may be issued by the decision-making unit.

The Mechanism of the Redundant System

Figure 3:
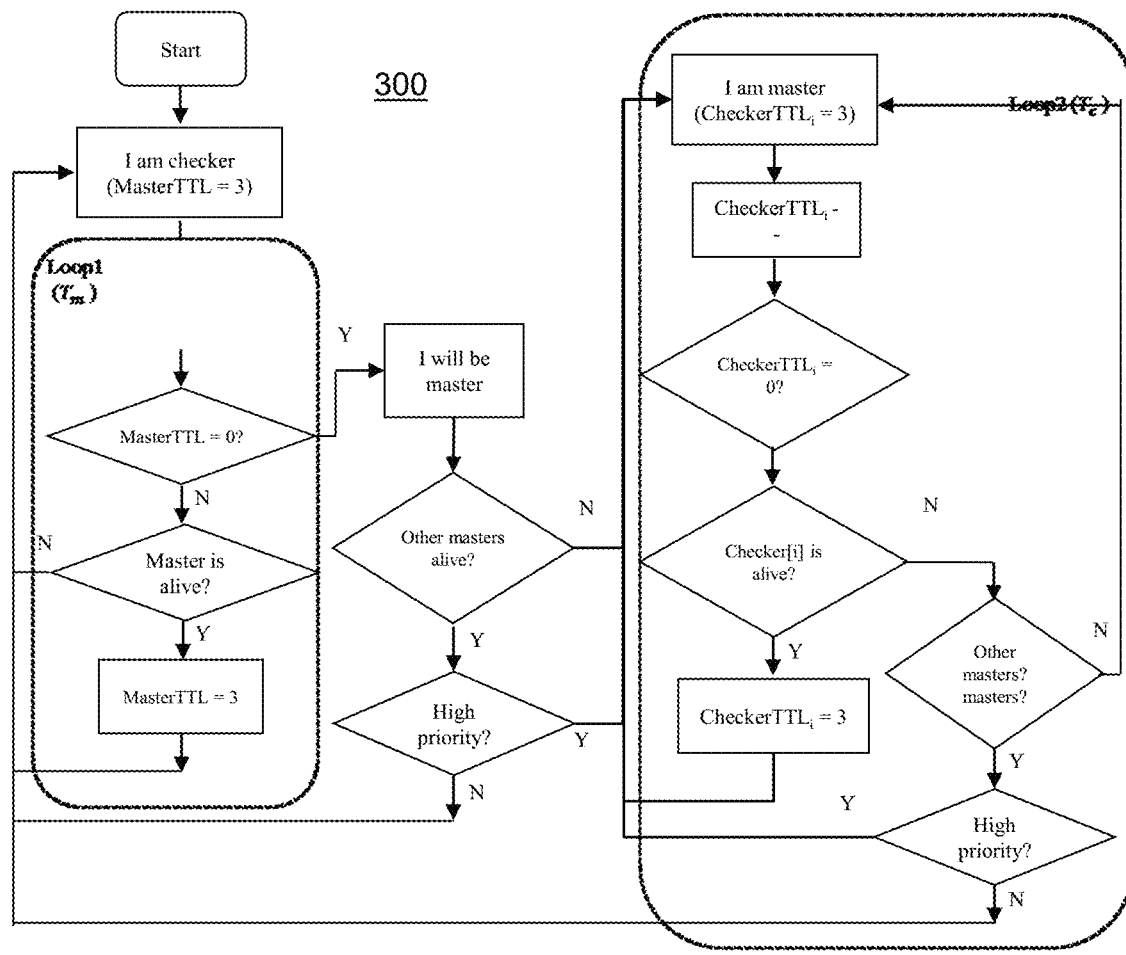
FIG. 3 shows a flowchart of a master selection mechanism according to an embodiment of the present matter.

Referring to FIG. 3 there is shown a flowchart of a master selection mechanism 300 for the channels according to an embodiment of the present matter. At any given time, there is only one channel providing an operation path for signals from the input layer to the output layer for the system to function normally. This channel may be termed the primary channel. Signals in this channel have to pass through the decision-making unit in the decision layer which includes integrated voting functions. The redundant channels may be termed checkers. They may be selected by the selection mechanism through the IO bus. The states of the channels can change dynamically if a fault occurs in the primary channel. For internal information exchange among the primary channel and its checkers, the decision-making unit uses two types of buses as discussed earlier: the internal bus for information exchange with other channels; and the IO bus for selection of the primary channel. All buses operate independently. A fault on one channel does not affect the operation of another channel.

Figure 4:
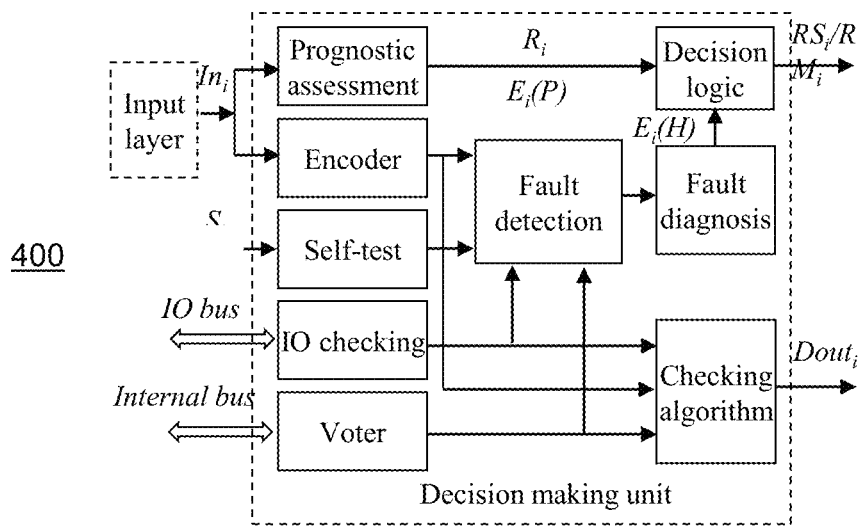
FIG. 4 shows a block diagram of the decision-making unit according to an embodiment of the present matter.

Referring to FIG. 4 there is shown a block diagram of the decision-making unit 400 according to an embodiment of the present matter. Information is transmitted over its internal bus to fault detection, fault diagnosis, and fault prognostic schemes to generate suitable reconfiguration decisions. The decision will include rapid power-off to the failed channels. If a channel and its spare have both failed, a failure signal $R_{Mi}$ is registered. This channel will be permanently removed from the system. As mentioned early, diversity in components selection has been extensively used to avoid simultaneous failures of all three channels in this system.

In particular, the $R_{Mi}$ signals are only provided by the primary channel under two cases. In other words when both a channel and its spare are in a state of failure; or neither are suitable to work at a given radiation level. In addition, it is assumed that cases of all three channels simultaneously encountering either faults or failure can be avoided by using a diversity of techniques.

The operating principle of the proposed system works as follows: when one channel fails to operate, which will be detected by the self-diagnosis and/or the function external-diagnosis units, the decision-making units in another channel will generate some reconfiguration recommendations to cut off the power in a timely manner and its spare channel will be powered up to form a new TMR core.

Figure 5:
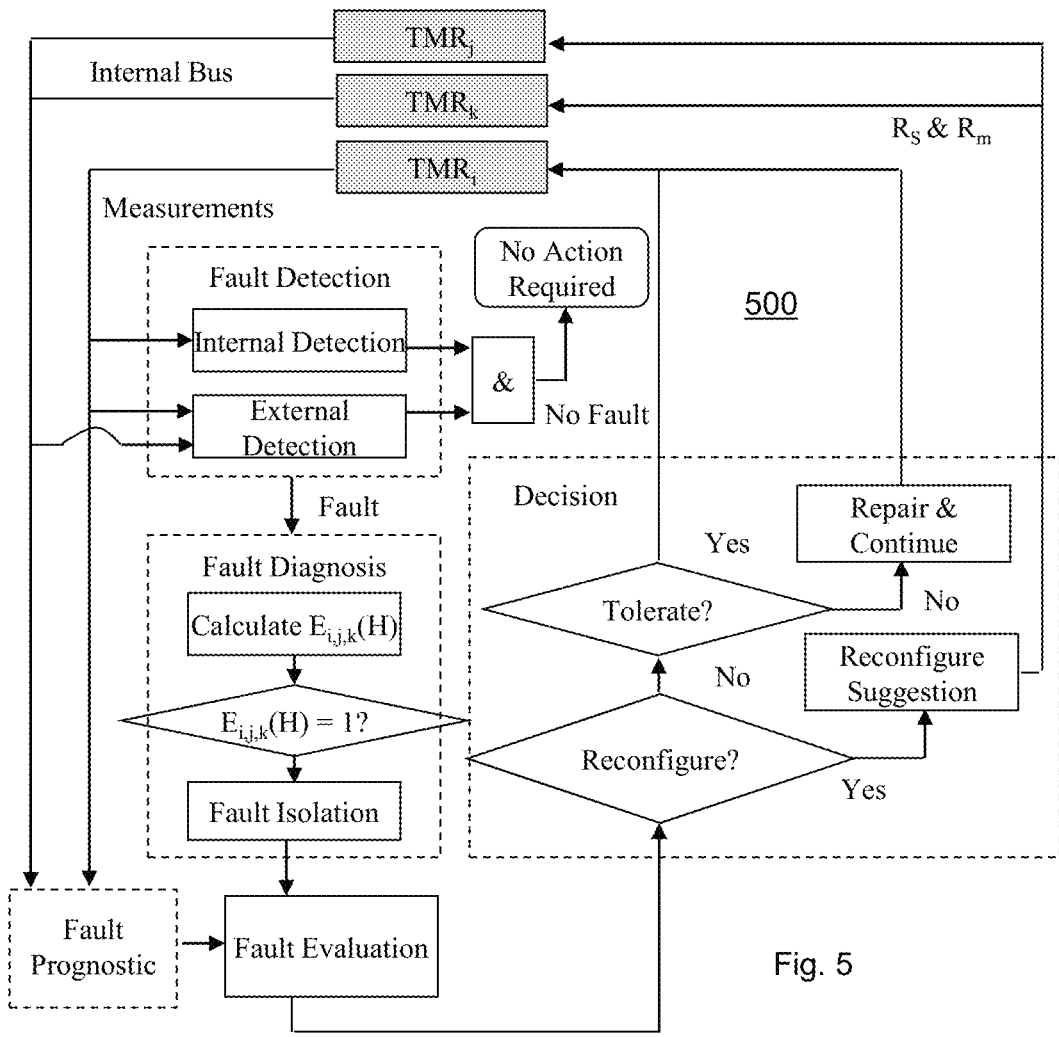
FIG. 5 shows a flowchart for the decision making unit according to an embodiment of the present matter.

Referring to FIG. 5 there is shown a flowchart 500 for decision making in the $i^{th}$ channel of the $TMR_i$ core, according to an embodiment of the present matter. The decision logic unit is configured to integrate the functions of fault diagnosis and component life-span prognostics to generate potential reconfiguration signals $R_{Si}$ and $R_{Mi}$. Specifically, all channels have the ability to detect, diagnose, and configure other channels in the TMR core until all channels have failed.

To illustrate, using the following example. If the semiconductor technology used in one channel $A_i$ has no capacity to operate correctly in the given radiation environment where $R_i=0$, or a channel $A_i$ and its corresponding spare $S_i$ have both failed, this channel and its spare will be instructed to power-off. Otherwise, only one of them is instructed to power-on. The active state of all channels $A_i$ and $S_i$ can be described in Eq. (6).

$$\begin{cases} S_i = 0 \ \& \ A_i = 0, & \text{if } F_{A_i} = 1 \ \& \ F_{S_i} = 1, \text{ or } R_i = 1 \\ S_i = \overline{A_i}, & \text{otherwise} \end{cases} \quad (6)$$

The detailed logic of the reconfiguration commands are determined by the outputs of the fault diagnosis and prognosis schemes, which are illustrated in Eq. (7) and Eq. (8). The signal $R_S$ is used to switch the power supply between the active channel and its spare; and the signal $R_M$ is used to remove the power supply of one active channel and that of its spare. If one of the detection function ($E_i(H)$), prognostic function ($E_i(P)$), and the predicted channel ($R_i$) selection is set, reconfiguration commands will be issued.

$$R_{Si} = \overline{R}_{Si} \quad \text{if } E_i(H) \geq 1 \text{ or } E_i(P) \geq 1 \ \& \ R_i = 0 \ (1 \leq i \leq 3). \quad (7)$$

$$\begin{cases} R_{Mi} = 0 & \text{if } R_j = 1 \text{ or } R_k = 1 \ (1 \leq i, j, k \leq 3, i \neq j \neq k) \\ R_{Mi} = 0 & \text{if } F_{Aj} = 1 \text{ and } F_{Sj} = 1 \ (1 \leq i, j \leq 3, i \neq j) \\ R_{Mi} = 1 & \text{otherwise} \end{cases} \quad (8)$$

Signals for the configurator suggestions are generated by the decision-making unit in other channels, as illustrated in Table 1.

TABLE 1

| configurator signal | $A_1 \ \& \ S_1$ | $A_2 \ \& \ S_2$ | $A_3 \ \& \ S_3$ | Primary |
|---|---|---|---|---|
| $R_{S1}$ | | ✓ | ✓ | |
| $R_{S2}$ | ✓ | | ✓ | |
| $R_{S3}$ | ✓ | ✓ | | |
| $R_{M1} \& R_{M2} \& R_{M3}$ | | | | ✓ |

In general, it is difficult to detect online radiation response of each semiconductor device in an electronic system without additional measurement/testing units. In the present redundant system, the detection focuses on the detection at the circuit-level and system-level. All circuit modules and subsystems are monitored by the external channels and/or itself to rapidly remove its power when it encounters radiation damage. Then, according to the output of circuit modules and subsystems, the damage to the component(s) may be analyzed. In a typical digital communication system, a sender is usually implemented with variety semiconductor components, which is listed in Column 2 of Table 2 below. The detailed radiation response of each component of some sample components and their related damage result on the subsystem is listed in Columns 3, 4, and 5 of Table 2, and a fault detection method for the component is illustrated in Column 6.

TABLE 2

The analysis of faults and detection mechanism
Total ionizing dose (TID).

| Function | Component | Radiation effects | Radiation responses of component | Damage response | Detection mechanism |
|---|---|---|---|---|---|
| Input Source | Voltage reference | TID | The degradation of $V_z$, within specification for high dose rate | The output voltage decreases, OPs work nonfunctional. | External detection |
| | | SEU, SEL | Short only for SEU, increasing with a latchup current. | | |
| | Bipolar OP | TID | The degradation is depending on both the manufacturer and the circuit configuration. | OPs work nonfunctional. The output of the function of input source will be incorrect. | External detection |
| | | SEL | The degradation in current during irradiation. | | |
| | | SET | To be susceptible to SET, positive SETs are expected for positive supply voltage, both input and supply voltages affect amplitude and duration | | |
| | NPN BJT | TID | The primary ionizing response of BJTs is the degradation of the current gain β ($I_c/I_b$), particularly at the low dose-rates. | The output of the function of input source will be incorrect. | External detection |
| Source Encoder | Voltage reference diode | TID | Increase of the reverse current and the changes of the forward voltage. | The AD's reference voltage will be incorrect. | External detection |
| | A/D converter | TID | Electronic parameters are higher under high radiation dose, the part experiences functional failure at high irradiation levels. | The output of the functions of source encoder will be incorrect. | External detection |
| | | SEU | A number of least significant bits (LSBs) are masked out with the condition of positive analog input; the LET threshold for the negative input is significantly higher. | | |
| | | SEL | The LET threshold for SEL is higher, no SEL was observed in some radiation tests. | | |
| | | SEFI | To cause every conversion to be in error until they were reset by cycling power to the device. | | |
| Channel Encoder & Decision Making & Digital Modulator | Micro-controller (CPU) | TID | Parameters exceed the maximum specification limit when the dose is more than 10K Rad (Si) | Microcontroller will be nonfunctional. | External detection |
| | | SEU, SEL, SEFI on SRAM | A logic gate switch, voltage transients, alteration of stored information, and destructive effects. | SRAM will be nonfunctional. | Internal detection |
| | | SET, SEL, SEU, SEFI, TID on Flash | SETs are high current transients, possibly upset producing events; memory's contents are altered during the transient events. | Flash will be nonfunctional. | Internal detection |
| | | SEE on GPIO | The logical switch on GPIO ports. | The output of GPIO port will be nonfunctional. | External detection |
| | Logic gate | TID | The degradation of electronical parameters during high irradiation level; the part is functional and stays within the specification limit. | Microcontroller will be nonfunctional | External detection |
| | | SEU, SEL | A logic gate switch, destructive effects occur. | | |
| Transceiver | Voltage reference diode | TID | Increase of the reverse current and the changes of the forward voltage. | Wireless transmitter will not work. | Internal detection |
| | Varactor | TID | Increase of the reverse current nut not of a serious degree, and the forward-voltage drop not essentially change. | Wireless transmitter will not work. | Internal detection |
| | Wireless transmitter | TDI | The failure of functions. | Wireless transmitter will be nonfunctional. | External detection |

As illustrated in Table 2, when radiation effects on semiconductor components happen, the function of related circuit block and/or subsystem may not work or be nonfunctional. Then, through the external detection and/or the internal detection of the nonfunctional of subsystems, semiconductor component can be online monitored. Subsequently, the decision-making unit generates reconfiguration suggestions to rapidly remove the power of its channel and to power on its spares. The system will not work when all redundant channel are damaged.

Figure 6A:
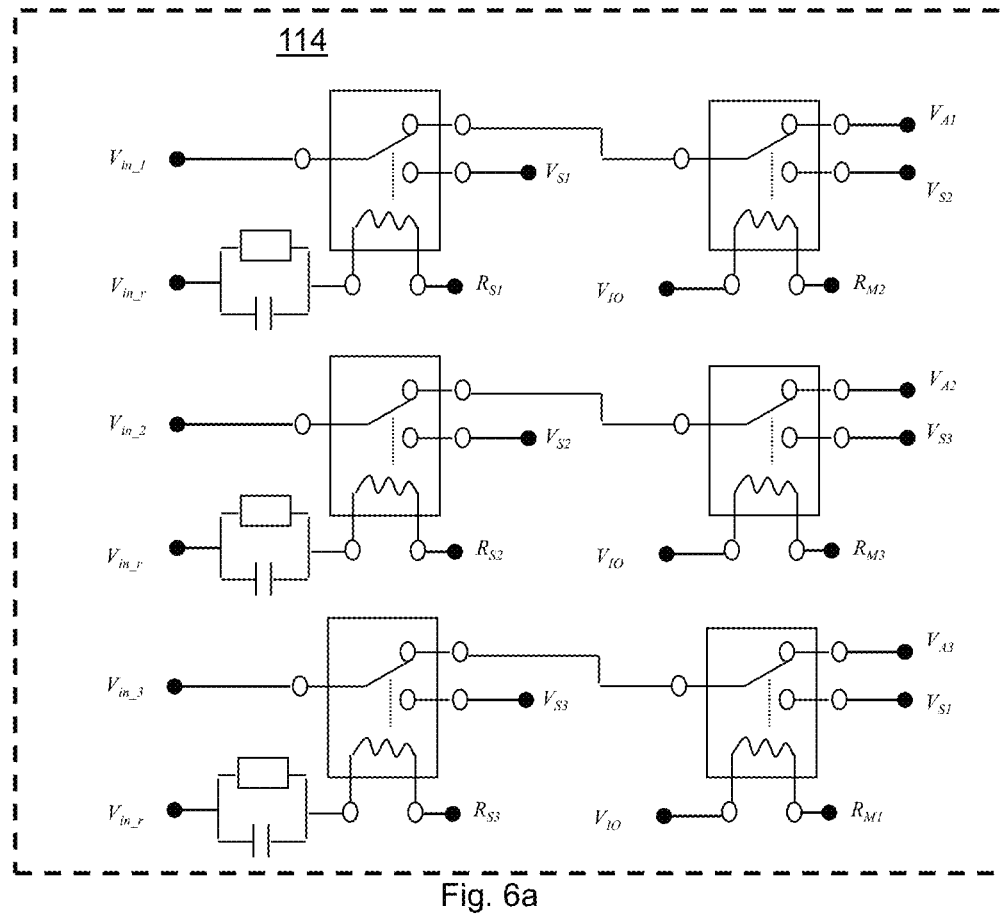
FIGS. 6a and 6b show a schematic diagram of a power configurator and a bus configurator respectively according to an embodiment of the present matter.
Figure 6B:
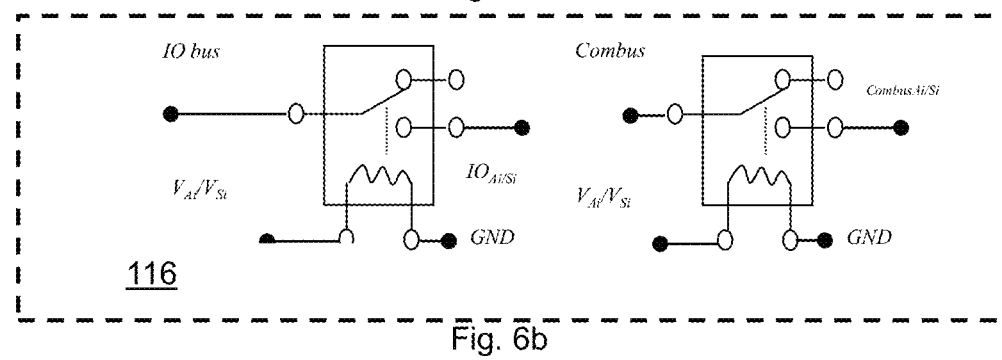

Referring to FIGS. 6a and 6b there is shown a schematic diagram of the power configurator 114 and the bus configurator 116 respectively. Both configurators are hardware switches and have radiation resistance higher than that of all redundant channels. This is so that the configurators 114, 116 do not contribute to a weak point in the radiation tolerance of system. In one embodiment the power configurator 114 is comprised of at least a pair of switches to control the power supply to each channel, as well as the location of internal buses (the bus configurator 116), which are determined by the reconfigure suggestions ($R_{Si}$ & $R_{Mi}$). The power configurator 114 is configured to guarantee that the system only ever has three channels working simultaneously. Recall that from photocurrent studies p-n junctions are less likely to sustain permanent damage from ionization radiation if the junctions are unpowered. Hence by having at most three channels powered minimizes the risk of damage to the remaining channels. As shown in FIG. 6a, the bus configurator 116, serves as the independent communication mechanism. This way, the bus will not affect other channels when one channel fails. In addition, $V_{in\_1}$, $V_{in\_2}$, $V_{in\_3}$, and $V_{in\_r}$ are the power inputs to the redundant channels and relays, and $V_{Ai}$, $V_{Si}$ are the power supplies for the TMR core active channels $A_i$ and spare channels $S_i$, which are controlled by reconfigure commands ($R_{Si}$ & $R_{Mi}$). In addition, the system has independent and diversified buses: internal bus (labelled Combus in FIG. 6b), to exchange information with other channels; and the IO bus (labelled IO bus in FIG. 6b), to accomplish the selection of primary channels.

To ensure reliable operation under given radiation conditions, both the bus configurator 116 and the power configurator 114 may have higher level of radiation tolerance than the rest of the electronic components in the system. Thus, both units may be designed using passive devices only, such as resistors (tolerant in at least a range of $10^4$-$10^{10}$ Gy), capacitors (tolerant in at least a range of $10^4$-$10^8$ Gy), and non-electronic relays (tolerant in at least a range of $10^5$-$10^7$ Gy).

As previously discussed, there is a difficulty in diagnosing radiation damage in electronic systems due to a lack of the self-diagnosis architecture and the online diagnosis methods of post-irradiation responses. Most existing fault detection and diagnosis (FDD) methods for electronic systems mainly focus on common hardware faults in redundant systems, not on cross-board (cross channel) radiation damage. Some model-based FDD methods have been considered, but it is not a trivial task to develop accurate models to deal with potential failure modes caused by radiation. Moreover, those methods usually detect and diagnose fault occurrences by using additional measurement/test units or majority voters, which as previously discussed are also affected and damaged by radiation. Therefore, it represents a major weakness in the whole system. Typical systems fail to deal with the detection and diagnosis of radiation damage as follows:

- analysis and identification of fault, error, and failure of devices and circuits under the given radiation condition.
- online logic to detect radiation damages and a real-time algorithm to diagnose and to locate radiation damages.
- validation of the developed detection method without physical radiation test in the design phase.

According in another embodiment of the present matter there is described a system and method for combining the radiation-tolerant architecture with online detection and diagnosis to timely identify/locate radiation damage in the system which may prolonging the life of the system.

Figure 7:
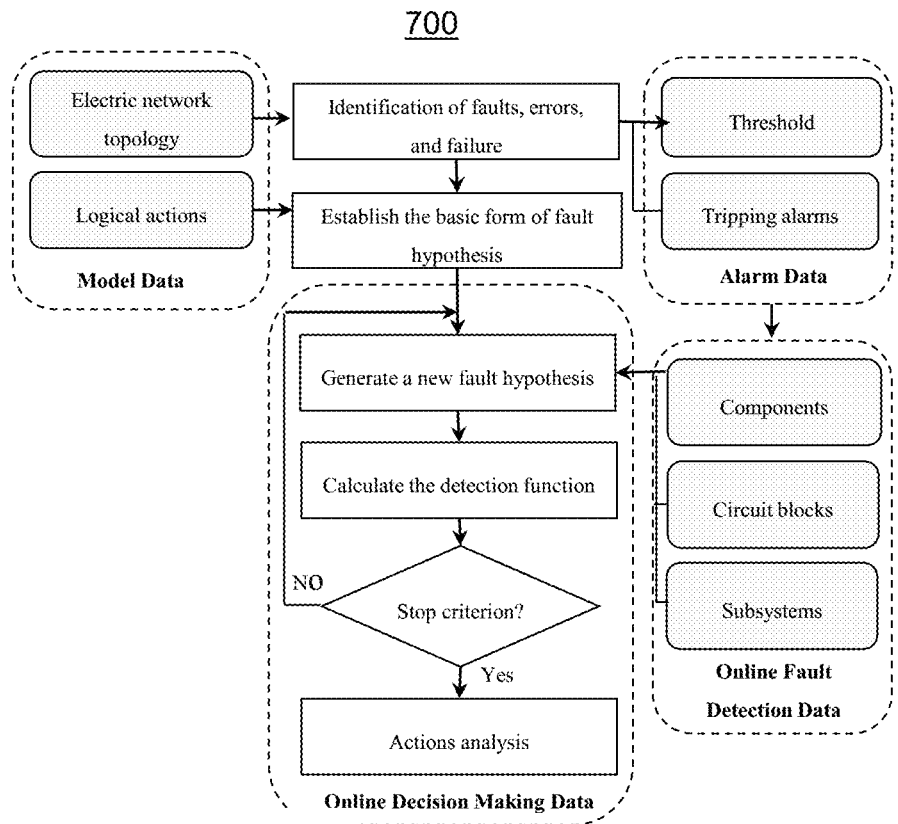
FIG. 7 shows a functional organization and data flow diagram for the fault detection and diagnosis in the decision-making unit according to an embodiment of the present matter.

Referring to FIG. 7 there is shown a functional organization and data flow diagram 700 for the fault detection and diagnosis in the decision making unit 400 referred to FIG. 4. The functions include two parts: (a) database creation and (b) real-time fault detection and prognosis for decision-making. In the first part, data specifications of the electronic components, boundaries of faults, errors, and failure are obtained to create an alarm database. Such information is used to create a fault detection hypothesis test framework. During online operation, measurements are then used to test the hypothesis, subsequently, to generate appropriate decisions in the decision-making unit 400 for control of the configurators 114, 116.

If a state of each level is defined as $x_i$ (i=1, 2, 3). The model can be described as follows:

$$\begin{cases} x_1(k+1) = (A + \Delta A)x(k) + (B + \Delta B)u(k) + B_r n_r(k) + B_o n_o(k) \\ x_2(k+1) = (C + \Delta C)(x_1(k) + \Delta x_1) \\ x_3(k+1) = y(k+1) = (D + \Delta D)(x_2(k) + \Delta x_2) \end{cases} \quad (7\text{-}1)$$

where $$x_\varphi(k) \in R^n, u(k) \in R^m, y(k) \in R^p, n_r(k) \in R^{l_r}, n_o(k) \in R^{l_o}$$

is the state of the different levels, the input, radiation fault, and the component/parameter fault, respectively. A, B, C, D are known parameter matrices; and $\Delta A$, $\Delta B$, $\Delta C$, $\Delta D$, $\Delta x_1$, $\Delta x_2$ are unknown fault and errors. As previously described, the system should detect and diagnose faults and errors ($\Delta A$, $\Delta B$, $\Delta C$, $\Delta D$, $\Delta x_1$, $\Delta x_2$) in a timely manner. A number of assumptions for faults are listed as follows:

Each component is either functioning, fault and failure; each circuit block is functional, operating incorrectly, and failure; each subsystem is functional, operating incorrectly, and failure; all components are functional at an initial moment.

As described earlier, definitions were provided for devices (D), Circuits (C) and Subsystems (S) along with their various states. The following are additional definitions are provided:

Definition 7 (Logic Action): $R_{dc}$ is the relation from set D to set C, and $R_{cs}$ is the relation from set C to set S. The entries of $R_{dc}$ and $R_{cs}$ are defined by:

$$M_{dc_{i,j}} = \begin{cases} 1, & (d_i, c_j) \in R_{dc} \\ 0, & (d_i, c_j) \notin R_{dc} \end{cases}.$$

and $$M_{cs_{j,k}} = \begin{cases} 1, & (c_j, s_k) \in R_{cs} \\ 0, & (c_j, s_k) \notin R_{cs} \end{cases}.$$

Thus, the relation from set D to set S can be expressed by:

$$M_{ds_{i,k}} = M_{dc_{i,j}} \times M_{cs_{j,k}}$$

Definition 8 (Fault Set): for the circuit block $c_j$, the fault set is $$Fc_j = \{Fc_{j_1}, \ldots, Fc_{j_{n_d}}\}.$$

$Fc_{j_i}$ describes ionizing radiation effects of the $i_{th}$ component $d_i$ to the circuit block $c_j$. $Fc_{j_0}$ denotes the functional state of the circuit block $c_j$, which considers components tolerance effect.

$$Fc_{j_i} = 0 \text{ if } M_{i,j} = 0.$$

For the subsystem $s_k$, the fault set is $$Fs_k = \{Fs_{k_1}, \ldots, Fs_{k_{n_c}}\}.$$

$Fs_{k_j}$ describes that ionizing radiation effects of $j_{th}$ circuit block $c_j$ to the sub-system $s_k$. $Fs_{k_0}$ denotes the functional state of the subsystem $s_k$.

$$Fs_{k_j}=0 \text{ if } M_{j,k}=0.$$

Identification of Fault, Error, and Failure

The identification focuses on analog and mixed circuit blocks with certain input. Suppose that u is the measured voltage of the output of one circuit block ($c_j$). An ambiguity region of the output of the circuit block ($c_j$) for all components $d_i$ can be created in time domain.

$$u^{d_i}(t) = \{u^{d_1}(t), u^{d_2}(t), \ldots, u^{d_{n_d}}(t)\}.$$

with $$u^{d_i}(t)=0 \text{ if } M_{i,j}=0 (1 \le i \le n_d, 1 \le j \le n_c).$$

In general, the element value with component tolerance is changed from Y to Y+ΔY. The upper and lower envelopes of the output of the circuit block ($c_j$) for all component responses are:

$$u^d_{upper}(t) = \{\max(u^{d_1}(t), \max(u^{d_2}(t)), \ldots, \max(u^{d_{n_d}}(t)))\}.$$

and $$u^d_{lower}(t) = \{\min(u^{d_1}(t)), \min(u^{d_2}(t)), \ldots, \min(u^{d_{n_d}}(t))\}.$$

Thus, the response for the functional state of the circuit block ($c_j$) is:

$$u_{lower}^d(t) \le u(t) \le u_{upper}^d(t).$$

On the other hand, for the output of the circuit block ($c_j$) of each component $d_i$ under the condition of the fault, error, and failure ($u_{fault}^{d_i}$, $i_{err}^{d_i}$, and $u_{fail}^{d_i}$), the upper and lower envelopes of the circuit $c_j$ output for sensitive component $d_i$ under the fault state are:

$$u_{fault}^{d_i}(t) \le u(t) \le u_{err}^{d_i}(t). \tag{7-2}$$

$$u_{err}^{d_i}(t) \le u(t) \le u_{fail}^{d_i}(t). \tag{7-3}$$

The fault, error, and failure of the circuit block ($c_j$) response $u_{fault}^{c_j}$, $u_{err}^{c_j}$, and $u_{fail}^{c_j}$ can also be obtained. The upper and lower envelopes of the fault state of the circuit $c_j$ response is:

$$u_{fault}^{c_j}(t) \le u(t) \le u_{err}^{c_j}(t). \tag{7-4}$$

The upper and lower envelopes of the broken state of the circuit block ($c_j$) response are:

$$u_{err}^{c_j}(t) \le u(t) \le u_{fail}^{c_j}(t). \tag{7-5}$$

According to Eq. (7-2)-Eq. (7-5), malfunction of components and circuit blocks in analog and mixed circuits can be classified into several types:

Component operates incorrectly, the output of related circuit block should be range from $u_{fault}^{d_i}$ to $u_{err}^{d_i}$;

Component fails, the output of related circuit block should be range from $u_{err}^{d_i}$ to $u_{fail}^{d_i}$;

Circuit block operates incorrectly, the output of circuit block should be range from $u_{fault}^{c_j}$ to $u_{err}^{c_j}$;

Circuit block is broken; the output of circuit block should be range from $u_{err}^{c_j}$ to $u_{fail}^{c_j}$.

Fault diagnosis in analog and mixed circuits aims to identify the current state of the circuit block according to the measured value u. If u is within the neighborhood of the nominal value under fault $F_i$, the similarity between the current state and fault $F_i$ is high. On the other hand, if u is out of the neighborhood, the similarity will be low. $U_{F_i}(u)$ is used to express the similarity between the current state and fault $F_i$ state. According to the maximum degree of criterion, if fault $F_i$ satisfies $$U_{F_i}(u) = \max\{U_{F_0}(u), U_{F_1}(u), U_{F_2}(u), \ldots, U_{F_{n_d}}(u)\}. \tag{7-6}$$

Then we can deem that u is subordinate to $F_i$, and the current state is more similar with fault $F_i$ state.

According to the characteristics of different circuit blocks and/or subsystems, the method of the determination of $U_{F_i}(u)$ can be separated into internal detection and external detection.

Referring to FIG. 7 there is shown a general framework for fault detection and diagnosis schemes 700 according to an embodiment of the present matter. As described above, channels may be composed of devices, circuits, and subsystems. Damage to the device propagates to the circuit and the subsystem. According to the characteristics of circuit modules and subsystems, detection of fault state can be carried out within its own channel or by using the data from other channels. For circuit modules, such as power related circuits, self-test circuits, faults can be detected within the channel. However, other circuit modules, particularly with uncertain inputs, such as sensor inputs, sub-functional blocks, it would be a challenge to validate their functionalities within the channel. The fault detection is often accomplished by comparing with the measurements from other channels. These two approaches may be described as follows.

Figure 8:
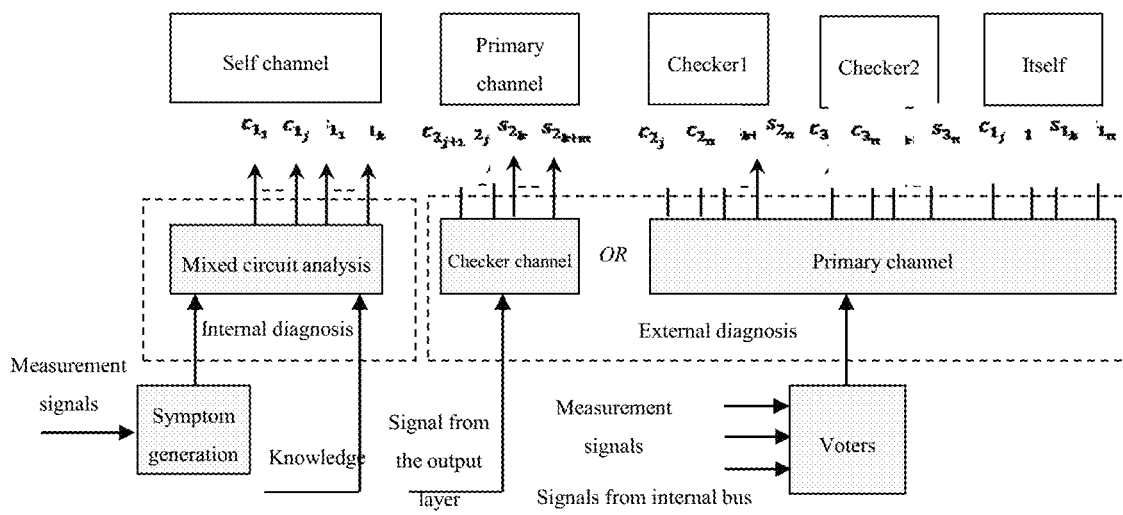
FIG. 8 shows a block diagram for detection logic allocation according to an embodiment of the present matter.
Figure 9:
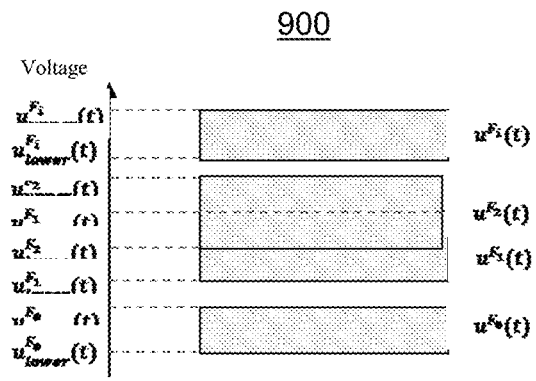
FIG. 9 shows voltage levels of a circuit block under a fault state according to an embodiment of the present matter.

Referring to FIG. 8 there is shown a block diagram for detection logic allocation 800 according to an embodiment of the present matter. Considering first internal detection. For analog and mixed circuits with certain input, the determinate $U_{F_i}(u)$ is accomplished by the comparison of the measured voltage with the voltage distribution under the fault state. The voltage distribution under the fault state can be obtained from the calculation result of the identification of the fault, error, and failure. For example, suppose the voltage distribution of a circuit block ($c_j$) under the fault state is presented as shown in FIG. 9 which illustrates voltage levels of a circuit block under the fault state.

When there is free space between $u^{F_0}(t)$ and $u^{F_i}(t)$, if the measured voltage u is located at the region of $u^{F_0}(t)$ or $u^{F_i}(t)$ then $$U_{F_0}(u)=1 \text{ or } U_{F_i}(u)=1.$$

When there has no free space between $u^{F_1}(t)$ and $u^{F_2}(t)$. If u is located at the overlap region of $u^{F_1}(t)$ and $u^{F_2}(t)$, the similarity between the current state and fault $F_1$, $F_2$ state can be determined by sensitivity analysis for $d_1$ and $d_2$.

On the other hand for external detection, for those circuit blocks with uncertain input, the determinate $U_{F_i}(u)$ is accomplished by combining with the error detection code and the voter mechanism. The information of circuit blocks and subsystems can be encoded and transmitted to the primary channel through the internal bus. Then, the primary channel accomplishes the function of detection damages among all three channels. As previously mentioned, the inputs of those circuits are unknown, moreover, in high level radiation fields, radiation damage may occur in one or two even three of the redundancies simultaneously. The detection of radiation damage in those circuits is difficult by only using majority voters and/or additional test/detection units.

A filter function may be used to detect radiation damage in the three channels according to past and present measurements, which is expressed in Eq. (7-7). The detection function will output the states of those circuit blocks.

$$[X_{1j}, X_{2j}, X_{3j}, Y_{1j}, Y_{2j}, Y_{3j}] = f(m_{1j}, m_{2j}, m_{3j}, p_{1j}, p_{2j}, p_{3j}). \quad (7\text{-}7)$$

where
  $m_{l_j}$ is the present measurement of the circuit block j in the channel l;
  $p_{l_j}$ is the past measurement of the circuit block j in the channel l;
  $X_{l_j}$, $Y_{l_j}$ is the state of the circuit block j in the channel l.

Based on the above definitions, a fault hypothesis for malfunctions of circuit blocks and subsystems can be formed in Eq. (7-8), where the goal is to integrate states of circuit blocks and sub systems.

$$H = [X, Y]. \quad (7\text{-}8)$$

where X is the summary of $X_C$ and $X_S$, as well as Y is the summary of $Y_C$ and $Y_S$.

A detection function reflects the credibility of H as defined in Eq. (7-8). A smaller E(H) suggests a higher credibility of H. If the detection function is equal or greater than unity, a reconfigure command should be issued.

$$E(H) = \sum_{j}^{n_c} \left( W_{xc_j} x_{c_j} + W_{yc_j} y_{c_j} \right) + \sum_{k}^{n_s} \left( W_{xs_k} x_{s_k} + W_{ys_k} y_{s_k} \right). \quad (7\text{-}9)$$

where $W_{xc_j}$, $W_{xc_j}$, $W_{xs_k}$, and $W_{ys_k}$ are the weights of the discrepancy index. The range of the weights is from 0.1 to 1. If $w_1 \gg w_2$, its means that the discrepancy index $w_1$ is much more important than $w_2$. The values of these weights are determined according to the significance of circuit blocks and subsystems in electronic systems.

Figure 10:
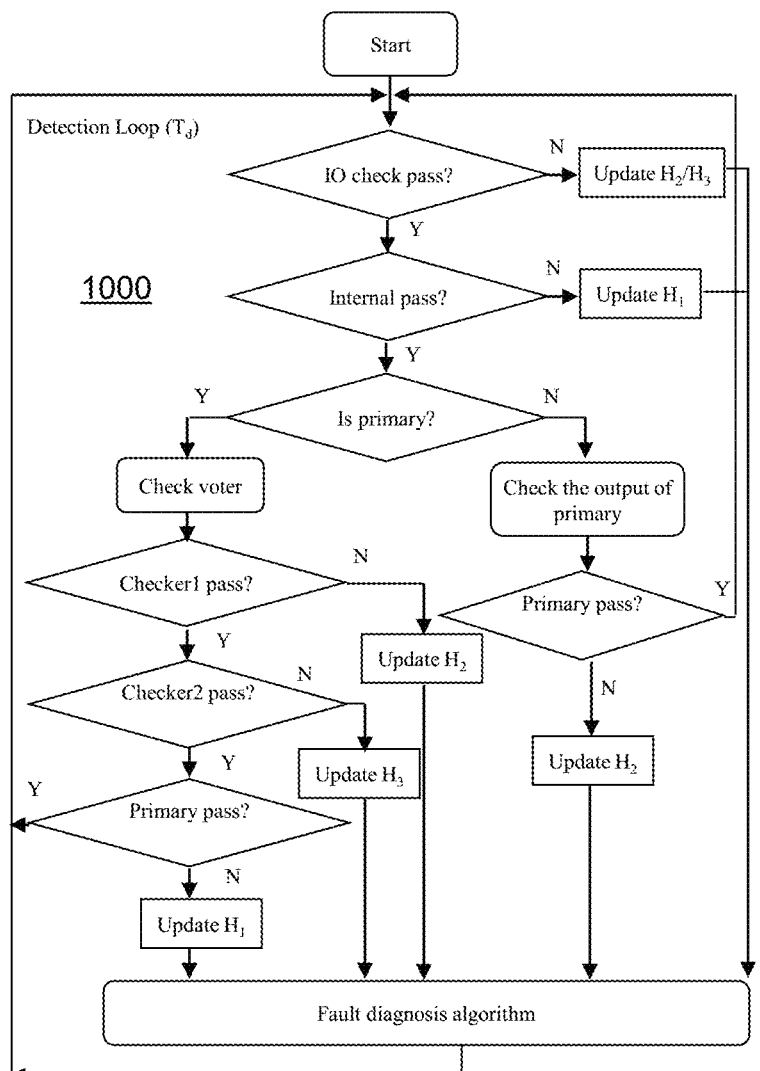
FIG. 10 shows a flowchart of a fault detection loop in each channel according to an embodiment of the present matter.

Referring now to FIG. 10 there is shown a flowchart of a fault detection loop 1000 in each channel according to an embodiment of the present matter. The states of fault hypothesis ($H_1$, $H_2$, $H_3$) will be timely updated for the calculation of detection functions ($E(H_1)$, $E(H_2)$, $E(H_3)$) in each channel for all three channels. The results of fault detection are transmitted to the diagnosis loop for the calculation of objective function, then the decision-making unit generates diagnosis results and reconfigure suggestions.

Referring now to FIG. 11 there is shown a flowchart of fault diagnosis 1100 according to an embodiment of the present matter. Firstly, new fault hypothesis is generated according to the system architecture. Subsequently, objective function is updated based on the results of fault detection. If the objective function E(H) is equal or greater than 1, $U_{F_i}(u)$ and the diagnosis suggestions should be generated.

As may be seen from the above methods and system have been described to achieve radiation tolerant design according to embodiments of the present matter. For example, a radiation tolerant architecture was described, along with techniques for hardening the radiation tolerant architecture against single event effects by using redundancy, diversity in different component technologies, and fault detection and diagnosis. Further a decision-logic unit for generating decisions to reconfigure faulty or damaged channels was also described in detail above. Effects of TID were also mentioned above along with approaches to mitigating TID which included techniques of shielding and component selection. These latter two techniques will now be discussed in greater detail below.

In accordance with another embodiment of the present matter radiation shielding protection with different materials is used to protect against common-mode damage of the COTS-based electronic components in the radiation tolerant system. However for portability of the wireless system, the size and weight of the shielding protection are also limited.

Figure 12:
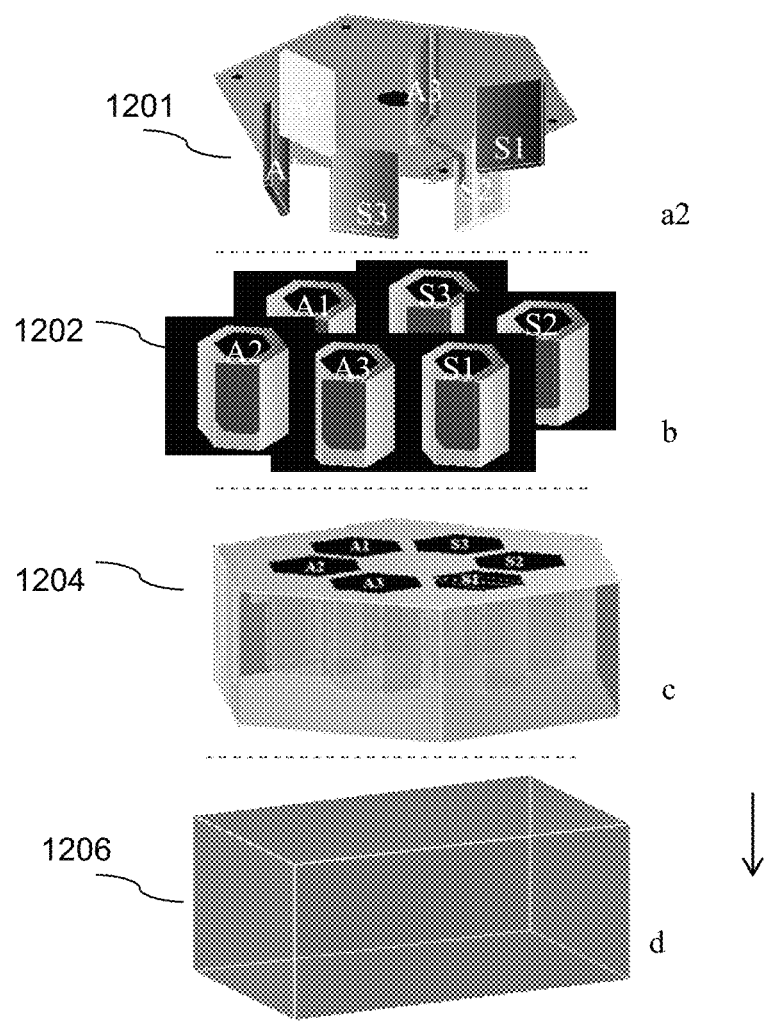

Referring to FIG. 12 there is shown a multi-layer radiation shielding 1200 according to an embodiment off the present matter. The shielding 1200 is composed of three layers of shielding as illustrated in FIG. 12b, FIG. 12c and FIG. 12d respectively The radiation shielding 1200 is configured to increase radiation tolerance of the system 100 while avoiding the common-mode damage and minimize accumulated dose. Recall that as mentioned earlier, radiation particles can change the normal operating parameters of electronic components and alter their electrical characteristics, subsequently lead to functional failures. If the accumulated dose exceeds the tolerance limit, components can suffer from permanent damage.

Referring to FIG. 12a1 and FIG. 12a2 there is shown an example physical circuit board configuration. In the example of the TMR core 100 each of the three active layers and their corresponding spares are constructed on individual and separated circuit boards. The circuit boards are arranged at different angles 1201 with respect to each other as for example shown in FIG. 12a1 reducing common mode effects. It is appreciated that many other angles and relative configurations between the channels may be employed. Referring to FIG. 12b there is shown the first layer of shielding which is composed of material that tightly encloses the circuit boards. Referring to FIG. 12c shows a lead block 1204 into which the enclosed circuit boards are embedded. Finally, referring to FIG. 12d there is shown a third layer 1206 which encapsulate the entire system. Different materials used in each layer are determined by the type and the radiation degradation factors of semiconductor devices on these circuit boards.

For a given radiation source, a given radiation dose rate, and a known shielding material, the required shielding thickness under a broad geometry can be calculated as follows:

$$d = \ln(B \cdot I_0 / I) / u.$$

Where linear attenuation coefficient (u) is the probability per unit thickness that particles interact with the material. This value is dependent upon the atomic number Z of the material and its density (p). The build-up factor (B), which is defined as the ratio of the intensity of the radiation at any point in a beam to the intensity of the primary radiation only at that point. According to the equation, various shielding materials may be selected, and their performance compared, the designed shielding thickness may also be evaluated to achieve the design objective, of reducing the total dose to a level less than the chosen threshold e.g. 20 K Rad (Si).

In an embodiment the 1st, $2^{nd}$ and 3rd layers may be for example lead, iron and aluminum respectively. Other combinations may be for example respectively: Tungsten, lead, copper or tungsten, lead, lead glass. These are by no means exhaustive combinations. The type of material could Theoretically, encompass all materials that may be used for radiation shielding if thick enough. The choice of the shielding material is dependent on many factors: desired attenuated radiation levels, effectiveness of heat dissipation, resistance to radiation damage, required thickness and weight, multiple use considerations, uniformity of shielding capability, permanence of shielding and availability.

In accordance with a further embodiment of the present invention a further method to mitigate effects of total ionizing dose, include selection of components by considering radiation degradation factors in diversified components in a pool of COTS components with similar functionalities to achieve higher radiation resistance under the given radiation conditions.

Component Selection

Figure 13:
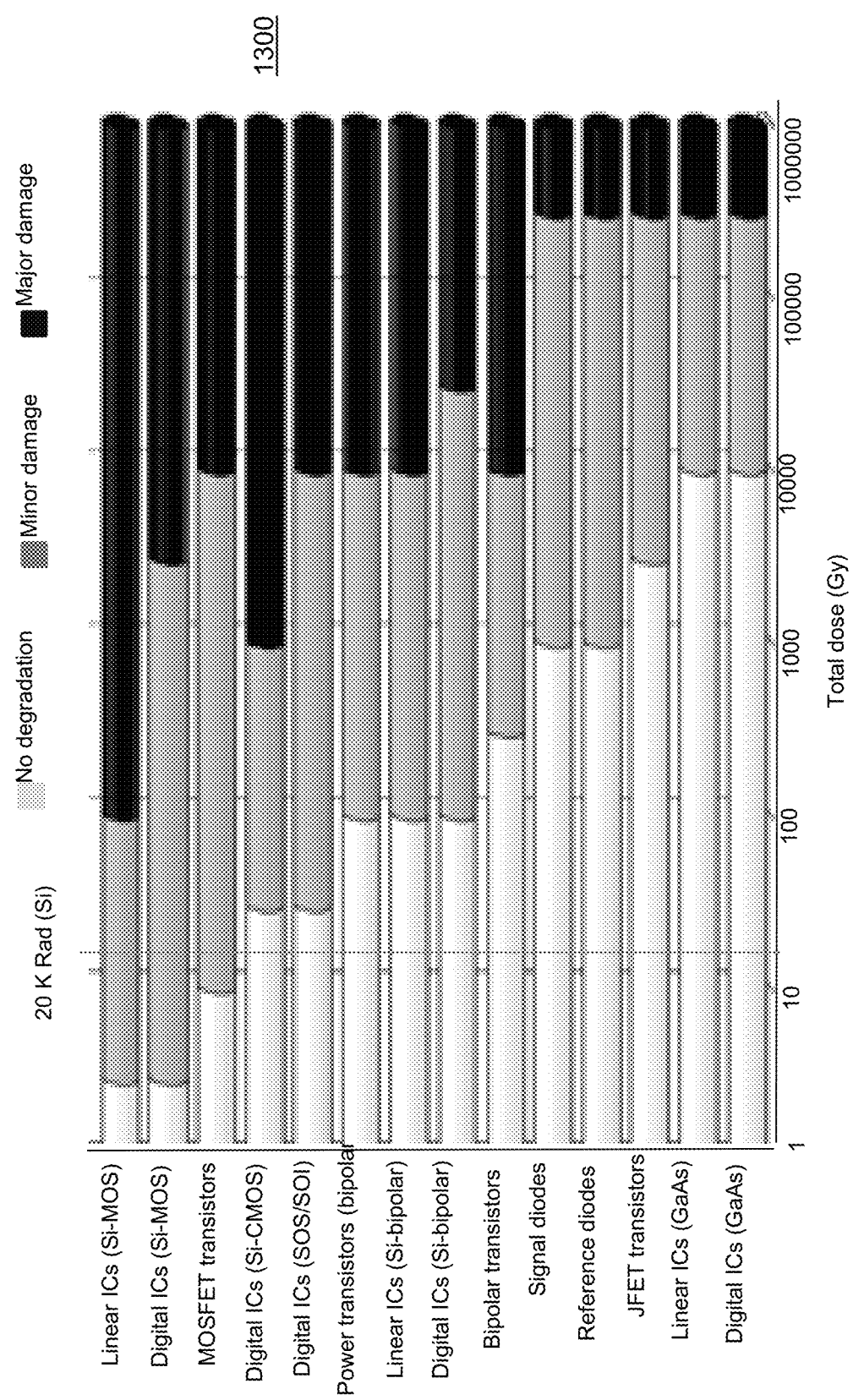
FIG. 13 shows a graph of typical radiation tolerance for selected components.

Component selection is a consideration in the design phase of COTS-based rad-hardened systems. Radiation effects are different for various devices, circuits and systems. How sensitive these effects are dependent on material compositions, structure of p-n junctions, manufacturing technologies, and domain of intended applications. According to radiation damage thresholds and radiation tolerance known in the art as shown in FIG. 13, as well as radiation test data in the literature most semiconductor components will experience device degradation and radiation damages when the total dose is more than 20 K Rad (Si) (1 Gy=100 Rad (Si). Therefore, the total dose limit is defined to a threshold value which in the present example is 20 K Rad (Si). Different thresholds will depend on other test data. The radiation-resistances of selected candidate components should be more than this threshold total dose limit.

As an example, by referring to radiation test data shown in FIG. 13 the following principles may be used in illustrating a component selection process for different active channels and their corresponding spare channels, respectively:
  To implement redundant channels and their spares with diversity semiconductor technologies, e.g., One channel uses bipolar components, second channel uses CMOS components, and third channel uses hybrid components;
  To select semiconductor component with higher radiation resistance by the calculation of its radiation degradation factor based on radiation test data, the selected component should work normally under the condition of total dose 20 K Rad (Si);
  To improve the radiation resistance of each channel by the assessment of reliability under the given radiation conditions.

Due to the fact that semiconductor components may have a number ($n_p$) of critical parameters, in an embodiment of the present matter, the radiation degradation factor is defined as the mean value of those degradation factors of all critical parameters, which can be described as follows.

$$\Delta = \frac{\sum_{i=1}^{n_p} \min\{|(P_{i_o} - P_{i_t})/(P_{i_o} - P_{i_f})|, 1\}}{n_p}.$$

TABLE

Summary of selected candidate components and radiation degradation factors

| Device Type | Device | $\Delta_{10K}$ | $\Delta_{20K}$ | $\Delta_{50K}$ | $\Delta_{100K}$ |
|---|---|---|---|---|---|
| BJT | 2N2222 | 0.1940 | 0.3201 | 0.4267 | 0.4591 |
| Voltage | LT1021 | 0.0774 | 0.1010 | 0.2104 | 0.3432 |
| reference | LT1009 | 0.0642 | 0.1099 | 0.5158 | 0.5786 |
|  | MP5010 | 0.0000 | 0.0000 | 0.0000 | 0.0000 |
|  | AD580 | 0.1510 | 0.0181 | 0.0087 | 0.0094 |
|  | REF-10 | 0.1408 | 0.3371 | 0.3204 | 0.3846 |
|  | AD780 | 0.0039 | 0.0229 | 0.0246 | 0.0209 |
|  | TL431 | 0.0055 | 0.0269 | 0.0238 | 0.0646 |
|  | LM117HVK | 0.1639 | 0.2916 | 0.2933 | 0.2464 |
|  | LP2951 | 0.1226 | 0.1737 | 0.3277 | 0.5699 |
|  | UDS2983 | 0.3607 | 0.2557 | 0.2472 | 0.2541 |
| OP amplifier | CLC502 | 0.0208 | 0.0365 | 0.0383 | 0.0365 |
|  | PA51M | 0.0409 | 0.0770 | 0.2989 | 0.2168 |
|  | LM108 | 0.2377 | 0.3964 | 0.6620 | 0.6537 |
|  | LM136 | 0.0098 | 0.0186 | 0.2431 | 0.2593 |
|  | MC35181 | 0.0689 | 0.1551 | 0.3673 | 0.5151 |
|  | LM317 | 0.2970 | 0.4120 | 0.5294 | 0.5568 |
|  | PA07M | 0.1360 | 0.0764 | 0.1757 | 0.2717 |
|  | OP43 | 0.1409 | 0.3128 | 0.4047 | 0.4182 |
|  | AD544 | 0.1331 | 0.3963 | 0.4759 | 0.5132 |
|  | AD713 | 0.3271 | 0.6739 | 0.8221 | 0.7451 |
|  | MP3518 | 0.0689 | 0.1551 | 0.3673 | 0.5151 |
|  | TL074 | 0.2402 | 0.3267 | 0.3742 | 0.3250 |
| Analog-to-digital | AD574 | 0.0178 | 0.0486 | 0.0633 | 0.0649 |
| converter | AD674 | 0.1735 | 0.1503 | 0.2741 | 0.3345 |
|  | AD7885 | 0.0181 | 0.0229 | 0.0246 | 0.0209 |
|  | AD713 | 0.2265 | 0.3899 | 0.4286 | 0.3926 |
| E²PROM | 28C010 | 0.0187 | 0.0465 | 0.1001 | 0.1179 |
| FPGA | A1280 | 0.0023 | 0.0244 | 0.1341 | 0.1326 |
| Microcontroller | 82C59 | 0.0638 | 0.0654 | 0.0985 | 0.1190 |
| Logic gate | 54AC02 | 0.0469 | 0.0494 | 0.0480 | 0.0724 |
|  | 54AC08 | 0.0133 | 0.0244 | 0.1850 | 0.2432 |

Figure 14:
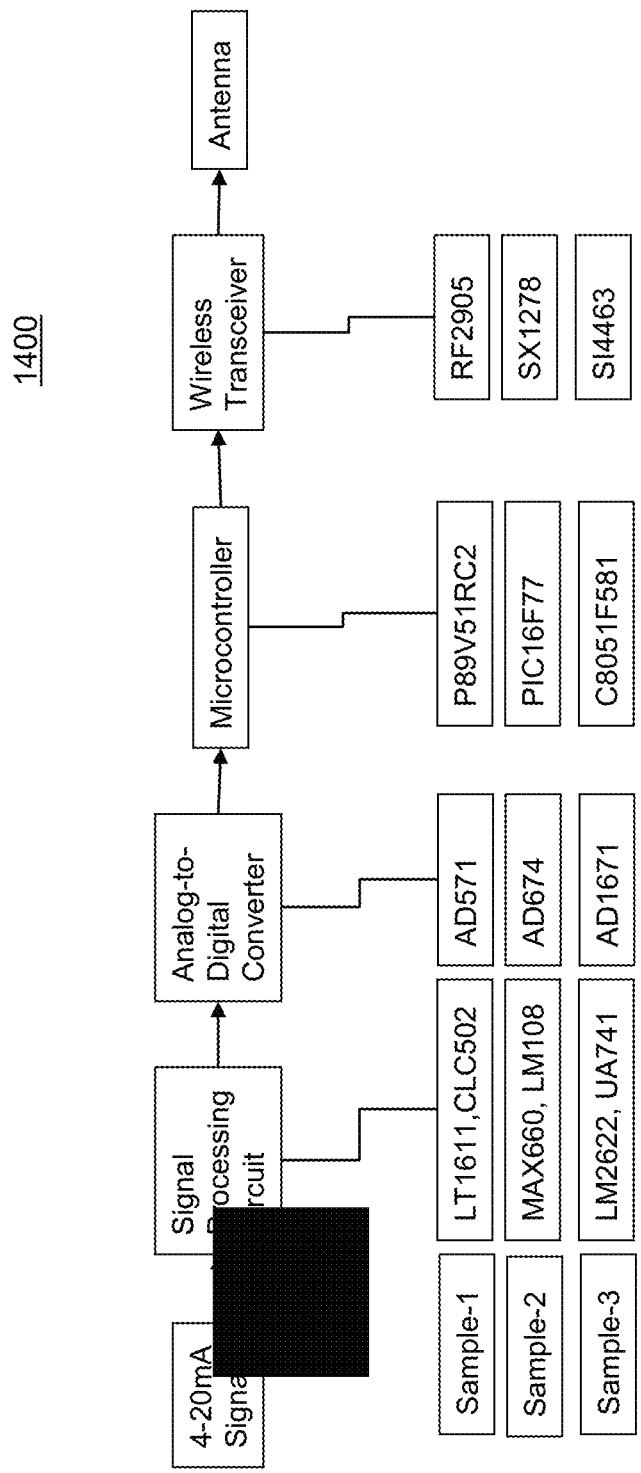
FIG. 14 shows a block diagram of a single channel wireless monitoring system with three diversified channels, according to an exemplary embodiment of the present matter.

Referring to FIG. 14 there is shown an example implementation a typical function in a high radiation environment. In this example the function is a typical wireless measurement and transmission system 1400 implemented in accordance with an embodiment of the present matter. Though there may be many different components and circuits, common building blocks are: signal processing circuit, analog-to-digital converter, microcontroller, and transceiver. However, those subsystems can be still built with different semiconductor technologies, and different components from different manufactures. As described in the present mater, an understanding of radiation responses of these devices under different radiation conditions provides information for the design of the wireless monitoring system. A number of semiconductor components listed in the Table above and also FIG. 13 may be selected to implement functional blocks in the wireless measurement and transmission system 1400. As illustrated in FIG. 14 three non-redundant wireless measurement and transmission units denoted as sample1, sample, and sample3 are built with diversified semiconductor technologies.

Table II below is a summary of semiconductor components used in irradiated devices. Sample-1, Sample-2, and Sample-3 are selected as $A_1/S_1$, $A_2/S_2$, $A_3/S_3$, separately

| Channel | Device ID | Semiconductor technology | Manufacture |
|---|---|---|---|
| Sample-1 | LT1611 | Bipolar | Linear Technology |
|  | CLC502 |  | National Semiconductor |
|  | AD571 |  | Analog Devices |
|  | RF2905 |  | RF Micro Devices |
|  | P89V51RC2 | CMOS | NXP |

-continued

| Channel | Device ID | Semiconductor technology | Manufacture |
|---|---|---|---|
| Sample-2 | REF03 | Bipolar | Analog Devices |
| | MAX660 | CMOS | Texas Instruments |
| | AD674 | | Analog Devices |
| | PIC16F77 | | Microchip |
| | SX1278 | | SEMTECH |
| Sample-3 | LM2662 | BiCMOS | Texas Instruments |
| | UA741 | Bipolar | STMicroelectronics |
| | AD1671 | BiCMOS | Analog Devices |
| | C8051F581 | TTL Logic | Silicon Labs |
| | SI4463 | | Silicon Labs |

Conclusion

A methodology is described to achieve rad-hardened design of communication systems without relying on rad-hardened semiconductor devices. Embodiments of the system provide for the use one or more of diversified component selection, redundancy in switchable communication channels, real-time fault-detection, and multi-layer shielding protection so that COTS components may achieve reliable operation in high radiation environments. Embodiments provide for a modern monitoring system through use of commercial off-the-shelf components for strong radiation environments is described herein. Reference is also made to a paper entitled "A Radiation-Tolerant Wireless Monitoring System Using a Redundant Architecture and Diversified Commercial Off-the Shelf Components, Q. Huang et. al, published in the IEEE Transactions On Nuclear Science Vol. 65. No. 9 September 2018, pages 2582-2592, the entirety of which is incorporated herein by reference.

The invention claimed is:

1. A method for a radiation tolerant electronic system subject to cumulative and single event radiation effects, the method comprising:
    executing one or more functions in a triple modular redundancy (TMR) core having at least three independent active channels, each channel duplicating the one or more functions, each independent active channel having a corresponding spare channel, said active and spare channels being implemented with commercial off-the-shelf (COTS) electronic components to execute said functions, the COTS electronic components being selected to be operable with a radiation resistance that exceeds a cumulative radiation exposure threshold corresponding to a total ionizing dose;
    powering at most three of said active channels in said TMR core;
    monitoring by use of independent fault detection and diagnosis logic unit within each channel, coupled between an input interface and an output interface of the channel to detect, independently of other channels, failure in the channel due to the single event effects of radiation and to generate a fault signal in response to the detection; and
    replacing a faulty active channel with its corresponding spare channel to maintain said TMR core of at least three powered active channels by reconfiguring power from the faulty active channel to the corresponding spare channel using a power reconfiguration unit external to said channels, responsive to the fault signal received from at least one of the fault detection and diagnosis logic units in the TMR core, wherein failure and replacement of channels in the TMR core during operation is determined independently by channels without additional fault detection external to the channels.

2. The method of claim 1, wherein said channels implement said one or more functions with distinct and different diversity of said COTS components.

3. The method of claim 2, wherein the fault detection and diagnosis logic unit in each channel may detect abnormal operation in any channel.

4. The method of claim 2, including reconfiguring data input output bus signals using a bus reconfiguration unit responsive to said fault signal received from at least one of the fault detection and diagnosis logic unit in any one of the active and redundant channels.

5. The method of claim 4, wherein the power reconfiguration unit and the bus reconfiguration unit are implemented with passive COTS components selected from one or more of resistors, capacitors, and non-electronic relays.

6. The method of claim 2 including:
    detecting failure in one of the channels by fault detection and diagnosis logic units in channels other than the failed channel; and
    providing a fault signal from fault detection and diagnosis logic units in said channels other than the failed channel, to remove power to the failed channel and to apply power to the failed channels spare channel.

7. The method of claim 1, including constructing each said channel on individual and separate circuit boards, wherein the separate circuit boards are oriented at different angles with respect to each other and encapsulated with multilayer shielding wherein each layer of shielding having different materials determined by the diversity of selected components.

8. A radiation tolerant electronic system architecture comprising:
    a triple modular redundancy (TMR) core of at least three independent active channels for executing one or more functions, in duplicate, each active channel having a corresponding spare channel, said active and spare channels being implemented with commercial off-the-shelf (COTS) electronic components to execute said functions, the COTS electronic components being selected to be operable with a radiation resistance that exceeds a cumulative radiation exposure threshold corresponding to a total ionizing dose;
    independent fault detection and diagnosis logic units within each channel coupled between an input interface and an output interface of the channel, for monitoring within each channel to detect, independently of other channels, failure in the channel due to the single event effects of radiation and generate a fault signal in response to the detection, wherein the failure is determined independently within the channel without additional fault detection external to the channel; and
    a power reconfiguration unit external to said channels for replacing a faulty active channel with its corresponding spare channel to maintain said TMR core of at least three powered active channels by reconfiguring power from the faulty channel to the corresponding spare channel responsive to the fault signal received from at least one of the fault detection and diagnosis logic unit in the TMR core active channels.

9. The radiation tolerant electronic system architecture of claim 8, wherein the fault detection and diagnosis logic unit in each channel may detect abnormal operation in any channel.

10. The radiation tolerant electronic system architecture of claim 9, including a bus reconfiguration unit responsive to said fault signal received from at least one of the fault detection and diagnosis logic unit in any one of the active and redundant channels for reconfiguring data input and data output bus signals.

11. The radiation tolerant electronic system architecture of claim 9, including constructing each said channel on individual and separate circuit boards, each being protected by diversified multi-layer shielding protection.

12. The radiation tolerant electronic system architecture of claim 11, wherein the separate circuit boards are oriented at different angles with respect to each other and encapsulated with the multilayer shielding wherein each layer of shielding having different materials determined by the diversity of selected components.

\* \* \* \* \*